US011494925B2

United States Patent
Liu

(10) Patent No.: US 11,494,925 B2
(45) Date of Patent: Nov. 8, 2022

(54) METHOD FOR DEPTH IMAGE ACQUISITION, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Chang Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/246,076

(22) Filed: Apr. 30, 2021

(65) Prior Publication Data
US 2021/0264626 A1    Aug. 26, 2021

Related U.S. Application Data

(63) Continuation of application No. PCT/CN2018/113581, filed on Nov. 2, 2018.

(51) Int. Cl.
*H04N 13/239* (2018.01)
*G06T 7/521* (2017.01)
(Continued)

(52) U.S. Cl.
CPC .............. *G06T 7/521* (2017.01); *G01B 11/22* (2013.01); *G01J 1/4204* (2013.01);
(Continued)

(58) Field of Classification Search
CPC ......... G06F 1/1633; G06T 2207/30201; G06T 7/521; G06T 7/90; G06T 2207/10028;
(Continued)

(56) References Cited

U.S. PATENT DOCUMENTS 8,577,092 B2    11/2013  Kim et al.
2016/0109232 A1*  4/2016  Shin ..................... G01C 3/085
                                                          348/140
(Continued)

FOREIGN PATENT DOCUMENTS

CN       106454090         2/2017
CN       106683133         5/2017
(Continued)

OTHER PUBLICATIONS

Nair R.(High Accuracy TOF and Stereo Sensor Fusion at Interactive Rates. In: Fusiello A., Murino V., Cucchiara R. (eds) Computer Vision—ECCV 2012. Workshops and Demonstrations. ECCV 2012. https://doi.org/10.1007/978-3-642-33868-7_60 (Year: 2012).*
(Continued)

*Primary Examiner* — Masum Billah
(74) *Attorney, Agent, or Firm* — Hodgson Russ LLP

(57) ABSTRACT

A method for depth image acquisition, a device (10) for depth image acquisition, and an electronic device (100) are provided. The method includes the following. An image of a field is obtained to determine a region of interest (ROI) in the image of the field. A current distance to the ROI is obtained. A time-of-flight depth camera (20) is controlled to obtain a current depth image of the field in response to the current distance being greater than a first distance. Both a dual camera (30) and the time-of-flight depth camera (20) are controlled to obtain the current depth image of the field in response to the current distance being not greater than the first distance.

17 Claims, 14 Drawing Sheets

(51) Int. Cl.

| | | |
|---|---|---|
| *G06T 7/11* | (2017.01) | |
| *G06T 7/13* | (2017.01) | |
| *G06T 7/593* | (2017.01) | |
| *H04N 13/254* | (2018.01) | |
| *G01S 17/931* | (2020.01) | |
| *G01B 11/22* | (2006.01) | |
| *G01J 1/42* | (2006.01) | |
| *G06T 7/40* | (2017.01) | |
| *H04N 5/232* | (2006.01) | |
| *H04N 13/00* | (2018.01) | |

(52) U.S. Cl.
CPC .............. *G01S 17/931* (2020.01); *G06T 7/11* (2017.01); *G06T 7/13* (2017.01); *G06T 7/40* (2013.01); *G06T 7/593* (2017.01); *H04N 5/23235* (2013.01); *H04N 13/239* (2018.05); *H04N 13/254* (2018.05); *G06T 2207/10028* (2013.01); *H04N 2013/0081* (2013.01)

(58) Field of Classification Search
CPC ....... G06T 2200/04; G06T 2207/10012; G06T 2207/20012; G06T 2207/20104; G01B 11/22; G01J 1/4204; G01S 17/86; G01S 17/894; G01S 17/931
USPC .......................................................... 348/47
See application file for complete search history.

(56) References Cited

U.S. PATENT DOCUMENTS

| | | |
|---|---|---|
| 2016/0205378 A1 | 7/2016 | Nevet et al. |
| 2018/0249143 A1 | 8/2018 | Calpe Maravilla et al. |
| 2018/0278918 A1 | 9/2018 | Peri |

FOREIGN PATENT DOCUMENTS

| | | |
|---|---|---|
| CN | 107110971 | 8/2017 |
| CN | 107610077 | 1/2018 |
| CN | 108234984 | 6/2018 |
| WO | 2016149438 | 9/2016 |

OTHER PUBLICATIONS

Nair et al., "High Accuracy TOF and Stereo Sensor Fusion at Interactive Rates," Lecture Notes in Computer Science, 2012, vol. 7584.
EPO, Partial Supplementary European Search Report for EP Application No. 18938921.6, dated Oct. 4, 2021.
WIPO, International Search Report for PCT/CN2018/113581, dated Jul. 31, 2019.
EPO, Extended European Search Report for EP Application No. 18938921.6, dated Jan. 25, 2022.
CNIPA, First Office Action for CN Application No. 201880098945.8, dated Mar. 2, 2022.

* cited by examiner

METHOD FOR DEPTH IMAGE ACQUISITION, ELECTRONIC DEVICE, AND STORAGE MEDIUM

CROSS-REFERENCE TO RELATED APPLICATION(S)

This application is a continuation of International Application No. PCT/CN2018/113581, filed on Nov. 2, 2018, the entire disclosure of which is incorporated herein by reference.

TECHNICAL FIELD

This disclosure relates to the technical field of three-dimensional imaging, and particularly to a method for depth image acquisition, an electronic device, and a storage medium.

BACKGROUND

At present, it is very common to install a dual camera on a smart phone so that the smart phone support a function of measuring depth of an object. However, accuracy of depth data measured by the dual camera needs to be improved. For example, when the surface of the object is relatively smooth and has less texture or when the object in the field is far away from the dual camera, the accuracy of the depth data measured by the dual camera is usually low. In addition, the manner of obtaining depth data using the dual camera requires a large amount of calculation.

SUMMARY

Implementations provide a method for depth image acquisition, an electronic device, and a storage medium.

According to a first aspect, a method for depth image acquisition is provided. The method for depth image acquisition is implemented in an electronic device. The electronic device includes a dual camera and a time-of-flight depth camera. The method includes the following. An image of a field is obtained to determine a region of interest (ROI) in the image of the field. A current distance to the ROI is obtained. The time-of-flight depth camera is controlled to obtain a current depth image of the field in response to the current distance being greater than a first distance. Both the dual camera and the time-of-flight depth camera are controlled to obtain the current depth image of the field in response to the current distance being not greater than the first distance.

According to a second aspect, an electronic device is provided. The electronic device includes a dual camera, a time-of-flight depth camera, and a processor. The processor is configured to: control the dual camera to obtain an image of a field to determine a ROI in the image of the field; obtain a current distance to the ROI; control the time-of-flight depth camera to obtain a current depth image of the field in response to the current distance being greater than a first distance; and control both the dual camera and the time-of-flight depth camera to obtain the current depth image of the field in response to the current distance being not greater than the first distance.

According to a third aspect, a non-transitory computer readable storage medium is provided. The non-transitory computer readable storage medium is configured to store a computer program. The computer program, when executed by a processor of an electronic device, causes the processor to: control a dual camera of the electronic device to obtain an image of a field to determine a region of interest (ROI) in the image of the field, obtain a current distance to the ROI, control a time-of-flight depth camera of the electronic device to obtain a current depth image of the field in response to the current distance being greater than a first distance, and control both the dual camera and the time-of-flight depth camera to obtain the current depth image of the field in response to the current distance being not greater than the first distance.

The further aspects and advantages of this application will be given in the following description, and some will become apparent from the following description or be understood through practice of this application.

BRIEF DESCRIPTION OF THE DRAWINGS

The above and/or further aspects and advantages of this application will become apparent and easy to be understood from the following description of implementations in conjunction with the accompanying drawings.

DETAILED DESCRIPTION

Figure 1:
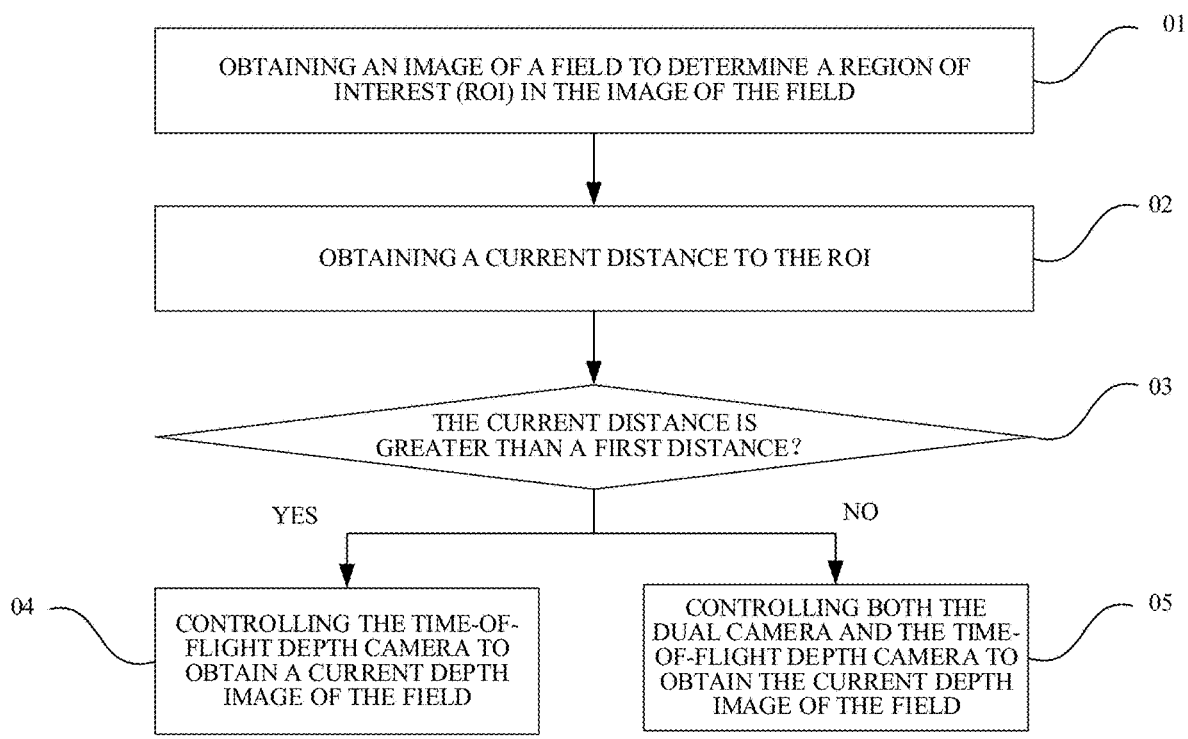
FIG. 1 is a schematic flow chart illustrating a method for depth image acquisition according to implementations.

Implementations of this application are described in detail below. Examples of the implementations are illustrated in the accompanying drawings. The same or similar reference numerals indicate the same or similar elements or elements with the same or similar functions. The implementations described below with reference to the accompanying drawings are for illustration and are intended to explain this application, but should not be understood as a limitation to this application.

Figure 3:
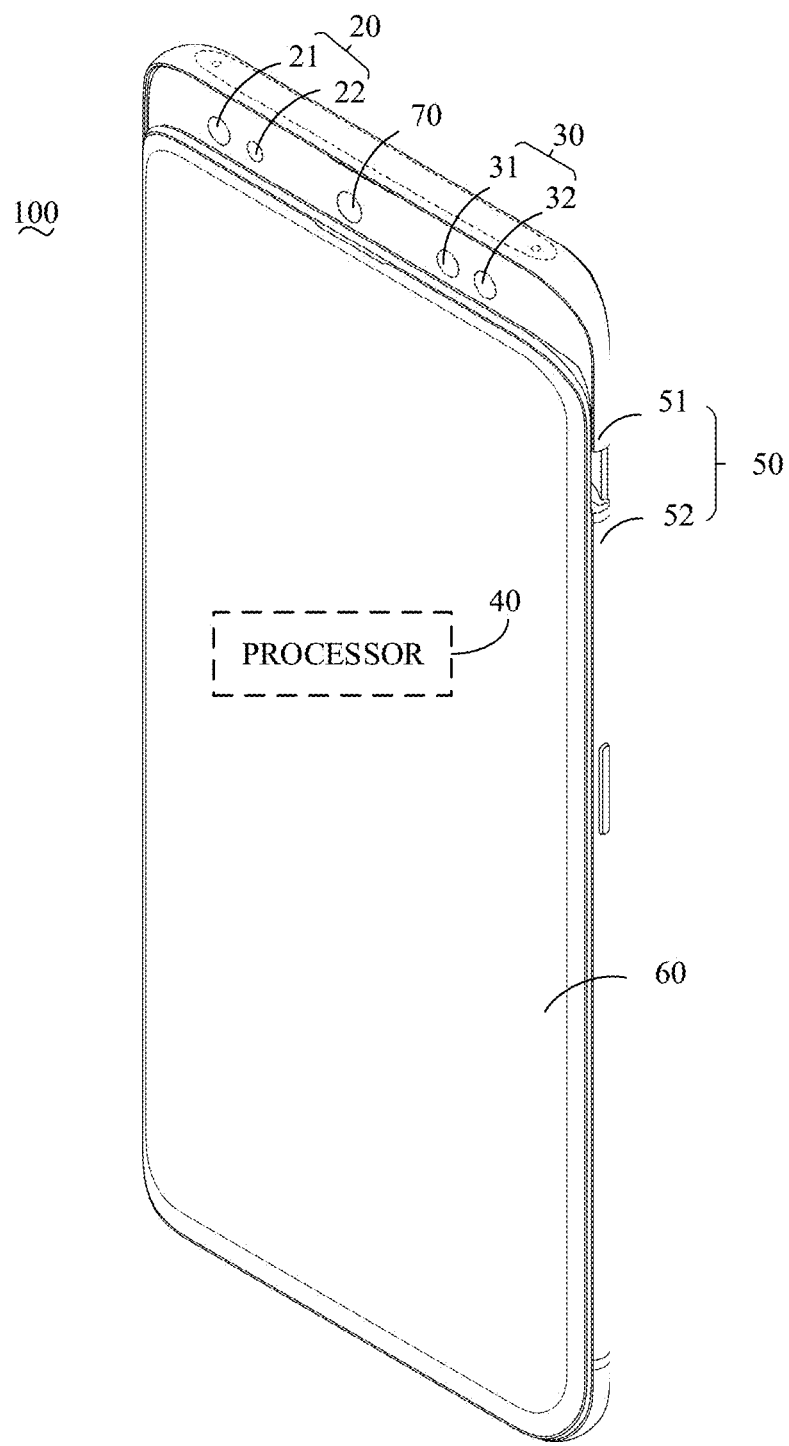
FIG. 3 and FIG. 4 are schematic diagrams illustrating a three-dimensional structure of an electronic device according to implementations.

Referring to FIG. 1 and FIG. 3, a method for depth image acquisition implemented in an electronic device 100 is provided. The electronic device 100 includes a dual camera 30 and a time-of-flight depth camera 20. The method begins at 01.

At 01, an image of a field is obtained to determine a region of interest (ROI) in the image of the field.

At 02, a current distance to the ROI is obtained.

At 03, whether the current distance is greater than a first distance is determined.

At 04, the time-of-flight depth camera 20 is controlled to obtain a current depth image of the field based on a determination that the current distance is greater than the first distance.

At 05, both the dual camera 30 and the time-of-flight depth camera 20 are controlled to obtain the current depth image of the field based on a determination that the current distance is not greater than the first distance.

Figure 2:
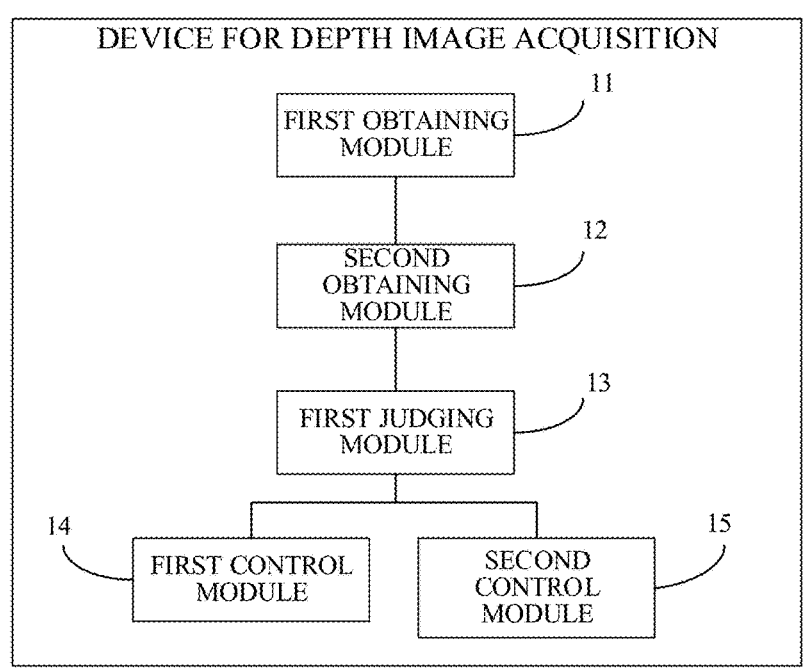
FIG. 2 is a schematic structural diagram illustrating a device for depth image acquisition according to implementations.

Referring to FIG. 2 and FIG. 3, a device 10 for depth image acquisition implemented in an electronic device 100 is provided. The device 10 includes a first obtaining module 11, a second obtaining module 12, a first judging module 13, a first control module 14, and a second control module 15. The operation 01 can be implemented by the first obtaining module 11. The operation 02 can be implemented by the second obtaining module 12. The operation 03 can be implemented by the first judging module 13. The operation 04 can be implemented by the first control module 14. The operation 05 can be implemented by the second control module 15.

That is, the first obtaining module 11 is configured to obtain the image of the field to determine the ROI in the image of the field. The second obtaining module 12 is configured to obtain the current distance to the ROI. The first judging module 13 is configured to determine whether the current distance is greater than the first distance. The first control module 14 is configured to control the time-of-flight depth camera 20 to obtain the current depth image of the field when the current distance is greater than the first distance. The second control module 15 is configured to control both the dual camera 30 and the time-of-flight depth camera 20 to obtain the current depth image of the field when the current distance is not greater than the first distance.

Referring to FIG. 3, the electronic device 100 is further provided. The electronic device 100 includes a dual camera 30, a time-of-flight depth camera 20, and a processor 40. The dual camera 30 is configured to capture the image of the field. The operations 01, 02, 03, 04, and 05 are further implemented by the processor 40. That is, the processor 40 is configured to obtain the image of the field to determine the ROI in the image of the field, obtain the current distance to the ROI, determine whether the current distance is greater than the first distance, control the time-of-flight depth camera 20 to obtain the current depth image of the field when the current distance is greater than the first distance, and control both the dual camera 30 and the time-of-flight depth camera 20 to obtain the current depth image of the field when the current distance is not greater than the first distance.

Referring to FIG. 3, the electronic device 100 is further provided. The electronic device 100 includes the dual camera 30, the time-of-flight depth camera 20, and the processor 40. The operation 01 can be implemented by both the dual camera 30 and the processor 40. The operation 02 can be implemented by the time-of-flight depth camera 20 and the processor. The operation 03 can be implemented by the processor 40. The operation 04 can be implemented by the time-of-flight depth camera 20 and the processor 40. The operation 05 can be implemented by all the dual camera 30, the time-of-flight depth camera 20, and the processor 40. That is, the dual camera 30 is configured to capture the image of the field. The processor 40 is configured to determine the ROI in the image of the field. Both the time-of-flight depth camera 20 and the processor 40 are configured to obtain the current distance to the ROI. The processor 40 is configured to determine whether the current distance is greater than the first distance. Both the time-of-flight depth camera 20 and the processor 40 are configured to obtain the current depth image of the field when the current distance is greater than the first distance. All the dual camera 30, the time-of-flight depth camera 20, and the processor 40 are configured to obtain the current depth image of the field when the current distance is not greater than the first distance.

The electronic device 100 may be a mobile phone, a tablet computer, a laptop, a game console, a smart watch, a smart bracelet, a head-mounted display device, a drone, and the like. In this application, the following illustrates a mobile phone as an example of the electronic device 100, which is not limited to a mobile phone.

The electronic device 100 further includes a housing 50. The dual camera 30 and the time-of-flight depth camera 20 are disposed on the housing 50.

Figure 4:
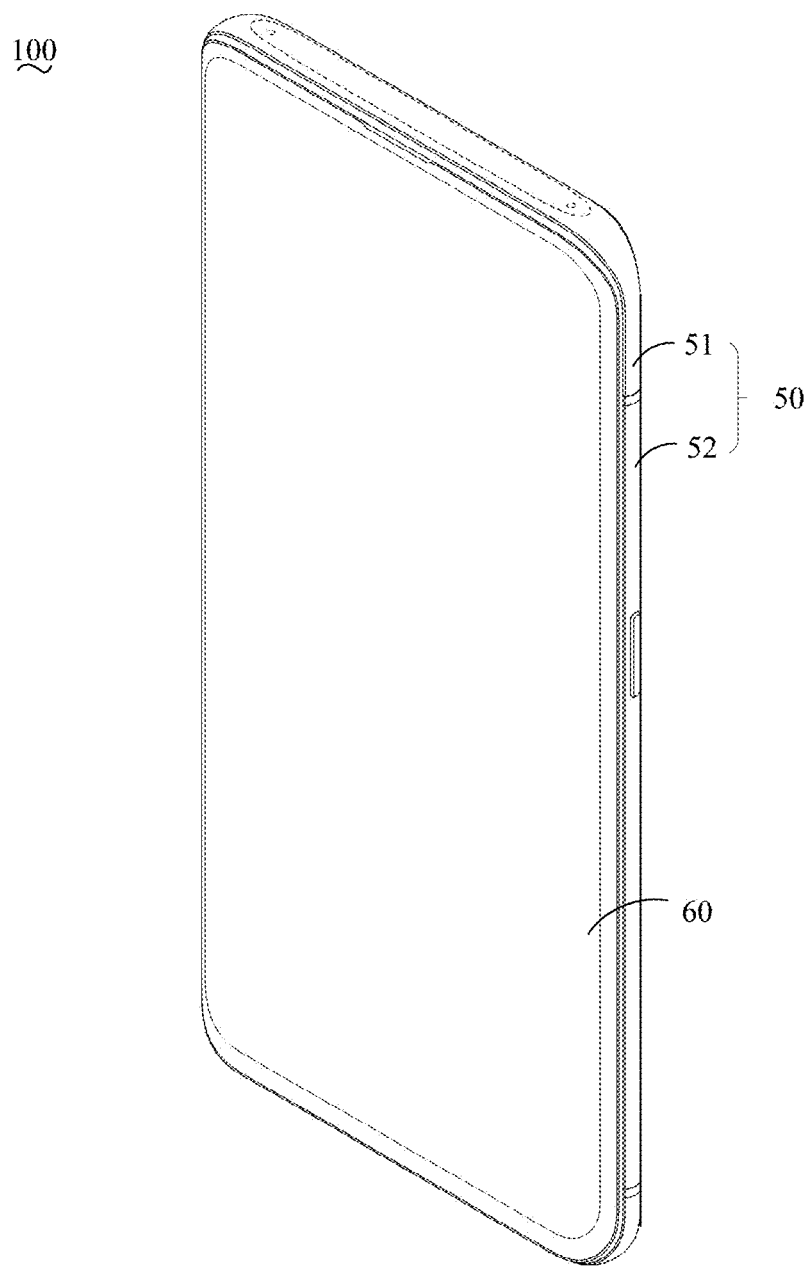

The housing 50 can be used as a carrier for installing functional elements of the electronic device 100. The housing 50 can provide protections such as dustproof, dropproof, and waterproof for the functional elements, where the functional elements can be a display screen 60, a receiver, and the like. In the implementation, the housing 50 includes a main body 52 and a movable bracket 51, where the movable bracket 51 can move relative to the main body 52 under driving of a driving device. For example, the movable bracket 51 can slide relative to the main body 52 to slide into the main body 52 (as illustrated in FIG. 4) or slide out from the main body 52 (as illustrated in FIG. 3). One part of the functional elements (for example, the display screen 60) may be installed on the main body 52, and another part of the functional elements (for example, the dual camera 30, the time-of-flight depth camera 20, and the receiver) may be installed on the movable bracket 51. The movement of the movable bracket 51 can drive another part of the functional elements to retract into the main body 52 or extend from the main body 52. The housing 50 of FIG. 3 and FIG. 4 is for illustration but is not limited herein.

The dual camera 30 and the time-of-flight depth camera 20 are installed on the housing 50. In an example, the housing 50 defines one or more collection windows. In the case that the housing 50 defines multiple collection windows, the dual camera 30 and the time-of-flight depth camera 20 are respectively installed in alignment with corresponding collection windows, such that the dual camera 30 and the time-of-flight depth camera 20 can collect depth information. In the implementation, the dual camera 30 and the time-of-flight depth camera 20 are installed on the movable bracket 51. When the user wishes to use the dual camera 30 or the time-of-flight depth camera 20, the movable bracket 51 can be triggered to slide out from the main body 52 to drive the dual camera 30 and the time-of-flight depth camera 20 to extend from the main body 52. When the dual camera 30 and the time-of-flight depth camera 20 are not in use, the movable bracket 51 can be triggered to slide into the main body 52 to drive the depth camera to retract into the main body 52.

The dual camera 30 includes a first camera 31 and a second camera 32. The first camera 31 and the second camera 32 are both visible light cameras and can be controlled by the processor 40 to acquire visible light images alone or cooperatively. The first camera 31 and the second camera 32 have overlapping fields of view. In this way, feature comparison can be performed on the first image captured by the first camera 31 and the second image captured by the second camera 32 to obtain depth data of the field.

The time-of-flight depth camera 20 includes a laser transmitter 22 and an image collector 21. Generally, the laser emitted by the laser transmitter 22 is an infrared laser, and correspondingly, the image collector 21 is an infrared camera. The laser transmitter 22 is configured to emit the laser into the field. The laser is reflected by the object in the field and then received by the image collector 21. The processor 40 is configured to obtain the depth data of the field according to the time of flight of the laser in the field and the speed of light.

According to the method of the implementation, the first camera 31 or the second camera 32 first captures the image of the field (or called field image), and the processor 40 reads the image of the field from the first camera 31 or the second camera 32 and further obtains the ROI in the field. The ROI can be a preset default region, such as a central region of the image of the field. Alternatively, the ROI can be a face region in the image of the field, where the face region may be recognized by the processor 40 using a face recognition algorithm. Alternatively, the ROI can be a region selected by the user. The electronic device 100 displays the image of the field on the display screen 60 for the user to preview, such that the user can click on a position in the display screen 60. The processor 40 takes a pixel or a few pixels on the image of the field corresponding to the position clicked by the user as the center and spreads around to obtain a region of a predetermined shape and a predetermined size, i.e., the ROI. The predetermined shape may be a circle, a rectangle, a square, a heart shape, a hexagon, etc., which is not limited herein.

Figure 5:
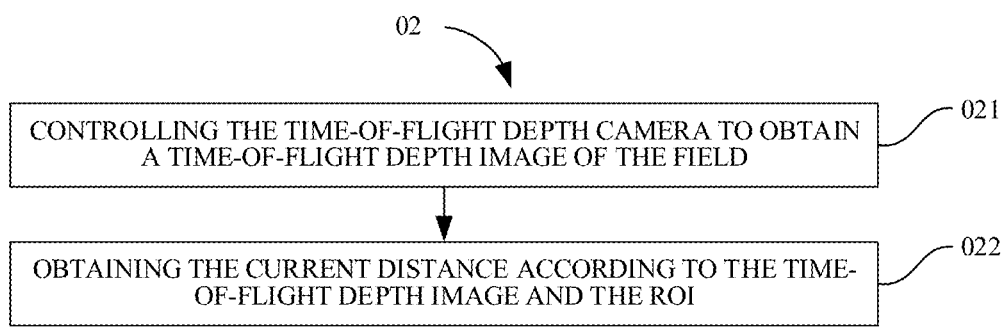
FIG. 5 is a schematic flow chart illustrating a method for depth image acquisition according to implementations.

After the ROI is determined, the processor 40 needs to determine the distance between the ROI and the electronic device 100, to select an appropriate manner for depth image acquisition to obtain the current depth image of the field. Referring to FIG. 5, the current distance to the ROI is obtained (i.e., the operation 02) as follows.

At 021, the time-of-flight depth camera 20 is controlled to obtain a time-of-flight depth image of the field.

At 022, the current distance is obtained according to the time-of-flight depth image and the ROI.

Figure 6:
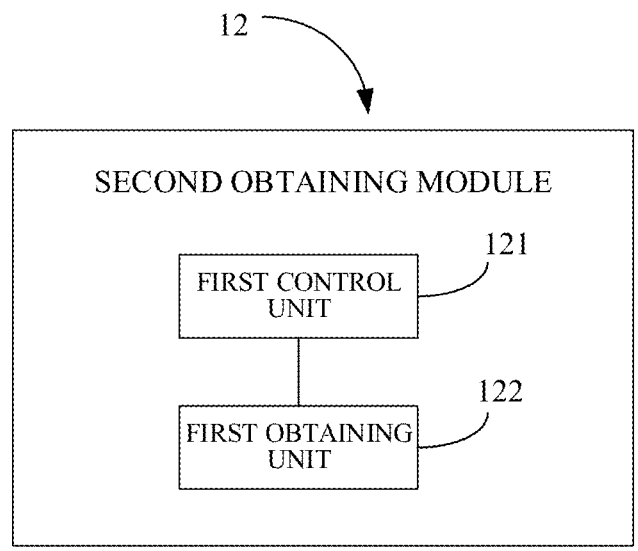
FIG. 6 is a schematic structural diagram illustrating a second obtaining module of a device for depth image acquisition according to implementations.

Referring to FIG. 6, the second obtaining module 12 includes a first control unit 121 and a first obtaining unit 122. The operation 021 can be implemented by the first control unit 121. The operation 022 can be implemented by the first obtaining unit 122. That is, the first control unit 121 is configured to control the time-of-flight depth camera 20 to obtain the time-of-flight depth image of the field. The first obtaining unit 122 is configured to obtain the current distance according to the time-of-flight depth image and the ROI.

Referring to FIG. 3, the operations 021 and 022 can be implemented by the processor 40. That is, the processor 40 is further configured to control the time-of-flight depth camera 20 to obtain the time-of-flight depth image of the field and obtain the current distance according to the time-of-flight depth image and the ROI.

Referring to FIG. 3, the operation 021 can be implemented by the time-of-flight depth camera 20 and the operation 022 can be implemented by the processor 40. That is, the time-of-flight depth camera 20 is configured to capture the time-of-flight depth image of the field. The processor is configured to obtain the current distance according to the time-of-flight depth image and the ROI.

The time-of-flight depth camera 20 can measure depth of the field and obtain the time-of-flight depth image in various manners.

For example, in the direct measurement manner, the processor 40 controls the laser transmitter 22 to turn on to emit laser to the field, and at the same time controls a timing circuit of each photosensitive pixel in an image sensor in the image collector 21 to start counting. The emitted laser is reflected by the object in the field and then received by the image collector 21. Because avalanche photodiodes in each photosensitive pixel in the image collector 21 work in Geiger-mode (the reverse bias voltage is higher than the avalanche voltage), avalanche effect occurs when a single photon is absorbed. As such, the output current reaches the maximum instantaneously (less than 1 ps), and then is fed back to the independent timing circuit of each photosensitive pixel to make the timing circuit stop counting. Each timing circuit outputs a count value to the processor 40, and the processor 40 can obtain original depth data of each pixel in the time-of-flight depth image according to the count value and the speed of light.

In the indirect measurement manner, the processor 40 controls the laser transmitter 22 to emit square wave pulse modulated laser to the field and the image collector 21 collects the laser in one or more complete pulse cycles. The photosensitive device in each photosensitive pixel in the image collector 21 can convert the received laser into current. The photosensitive device is connected with multiple high-frequency switches, which can lead current into different capacitors that can store charges. In this way, by controlling on and off of each high-frequency switch, the received laser is divided into two parts and the distance between the object and the time-of-flight depth camera 20 can be obtained according to currents corresponding to the two parts of the received laser, that is, the original depth data of each pixel in the time-of-flight depth image.

Assume that the image of the field containing the ROI is captured by the first camera 31. The processor 40 can determine a correspondence between each pixel in the image of the field and each pixel in the time-of-flight depth image according to a relative positional relationship between the first camera 31 and the image collector 21 of the time-of-flight depth camera 20. In this way, original depth data of each pixel in the ROI is obtained.

Subsequently, the processor 40 can average the original depth data of multiple pixels in the ROI and use the average value as the current distance to the ROI, and then compare the current distance with the first distance. When the current distance is greater than the first distance, the time-of-flight depth camera 20 is used to obtain the current depth image of the field. When the current distance is less than or equal to the first distance, both the dual camera 30 and the time-of-flight depth camera 20 are used to obtain the current depth image of the field.

Alternatively, the processor 40 can compare the original depth data of each pixel in the ROI with the first distance one by one. If the number of pixels whose original depth data is greater than the first distance is greater than the number of pixels whose original depth data is less than or equal to the first distance, the time-of-flight depth camera 20 is used to obtain the current depth image of the field. If the number of pixels whose original depth data is greater than the first distance is less than the number of pixels whose original depth data is less than or equal to the first distance, both the dual camera 30 and the time-of-flight depth camera 20 are used to obtain the current depth image of the field.

In the case that the current distance to the ROI is greater than the first distance or the number of pixels whose original depth data is greater than the first distance is greater than the number of pixels whose original depth data is less than or equal to the first distance, it means that the distance between an object corresponding to the ROI and the electronic device 100 is relatively long. In this case, accuracy of the current depth image acquired by the dual camera 30 is not high. Therefore, the time-of-flight depth camera 20 is used to obtain the current depth image. In the case that the current distance to the ROI is less than or equal to the first distance or the number of pixels whose original depth data is greater than the first distance is less than the number of pixels whose original depth data is less than or equal to the first distance, it means that the distance between the object corresponding to the ROI and the electronic device 100 is relatively short. In this case, both the dual camera 30 and the time-of-flight depth camera 20 can be used to obtain the current depth image. As depth data of an edge region or texture region obtained by the dual camera 30 is more accurate and depth data of a smooth region obtained by the time-of-flight depth camera 20 is more accurate, the accuracy of the current depth image obtained can be greatly improved.

According to the method for depth image acquisition, the device for depth image acquisition, and the electronic device 100, a manner for depth image acquisition corresponding to the current distance is selected based on the current distance between the ROI and the electronic device, which can improve accuracy of acquisition of the current depth image.

Figure 7:
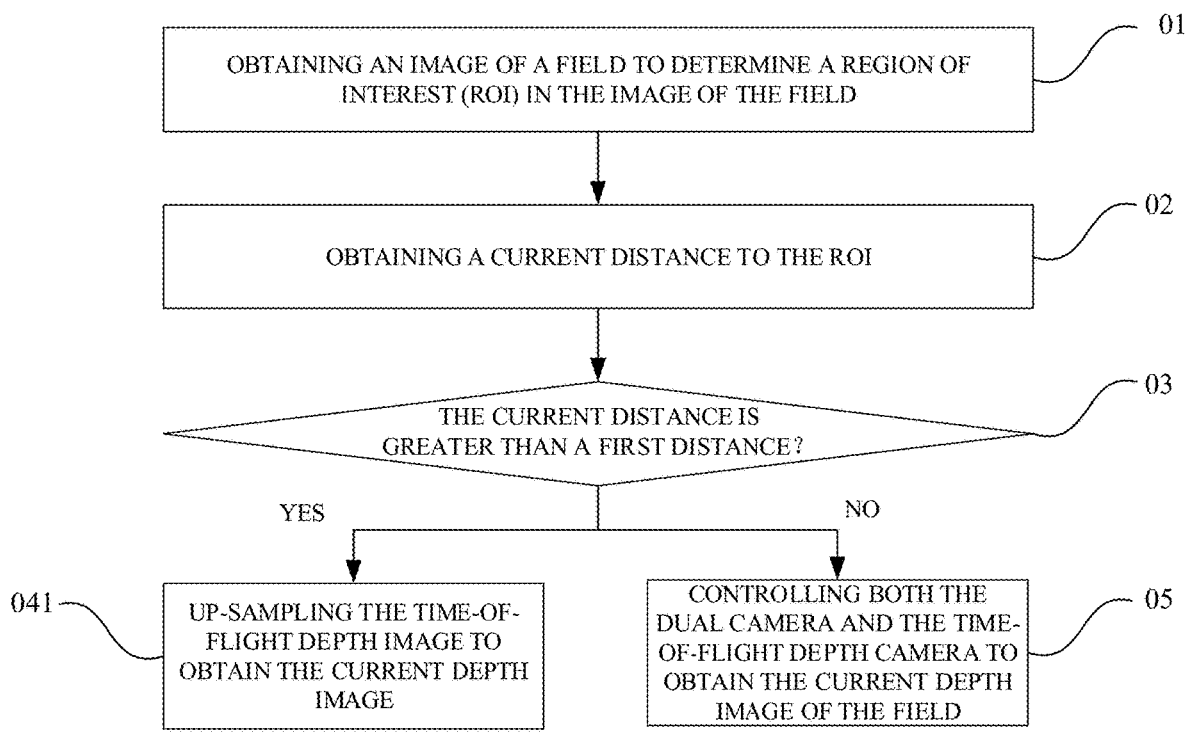
FIG. 7 is a schematic flow chart illustrating a method for depth image acquisition according to implementations.

Referring to FIG. 7, in some implementations, the time-of-flight depth image has a first resolution. When the current distance is greater than the first distance, the time-of-flight depth camera 20 is controlled (i.e., the operation 04) to obtain the current depth image of the field as follows.

At 041, the time-of-flight depth image is up-sampled to obtain the current depth image, where current depth image has a second resolution greater than the first resolution.

Figure 8:
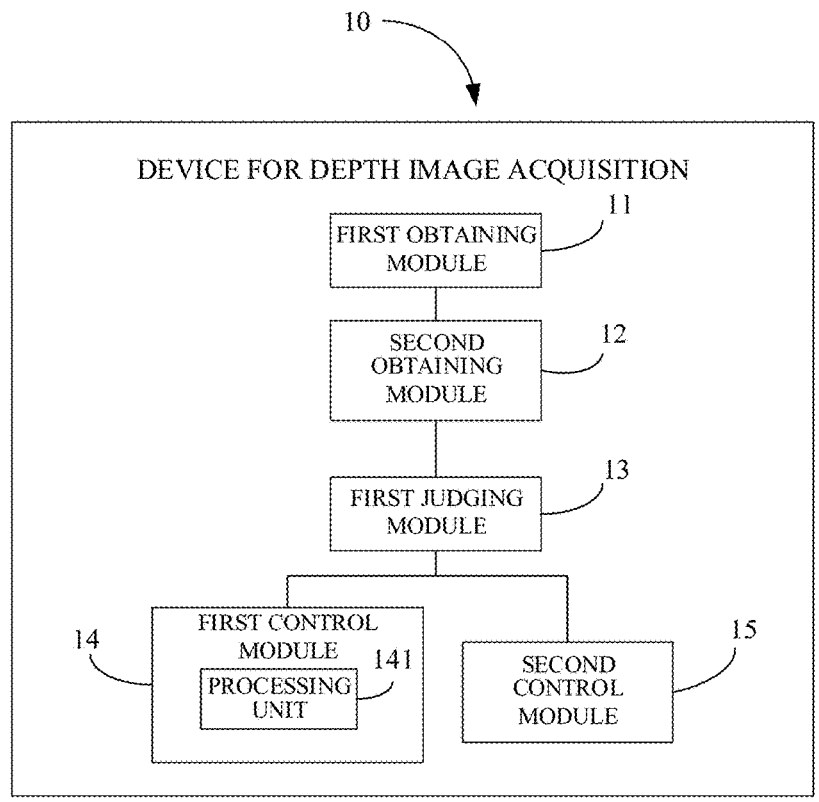
FIG. 8 is a schematic structural diagram illustrating a device for depth image acquisition according to implementations.

Referring to FIG. 8, in some examples, the first control module 14 includes a processing unit 141 and the operation 041 can be implemented by the processing unit 141. That is, the processing unit 141 can be configured to up-sample the time-of-flight depth image to obtain the current depth image. The current depth image has the second resolution greater than the first resolution.

Referring to FIG. 3, in some implementations, the operation 041 can be implemented by the processor 40. That is, the processor 40 can be further configured to up-sample the time-of-flight depth image to obtain the current depth image. The current depth image has the second resolution greater than the first resolution.

Generally, the time-of-flight depth image captured by the time-of-flight depth camera 20 has a lower resolution. The time-of-flight depth image of low resolution contains less depth data, which fails to meet requirements of some application scenarios. For example, in three-dimensional face recognition, less depth data has a greater impact on accuracy of face recognition. In three-dimensional (3D) modeling, it is impossible to build, with less depth data, a model with high consistency with a target modeling object, in other words, accuracy and appearance of the constructed model are not good. Therefore, the processor 40 needs to up-sample the time-of-flight depth image to obtain the current depth image. The current depth image has a higher resolution and contains much depth data, which can meet requirements of various application scenarios.

Figure 9:
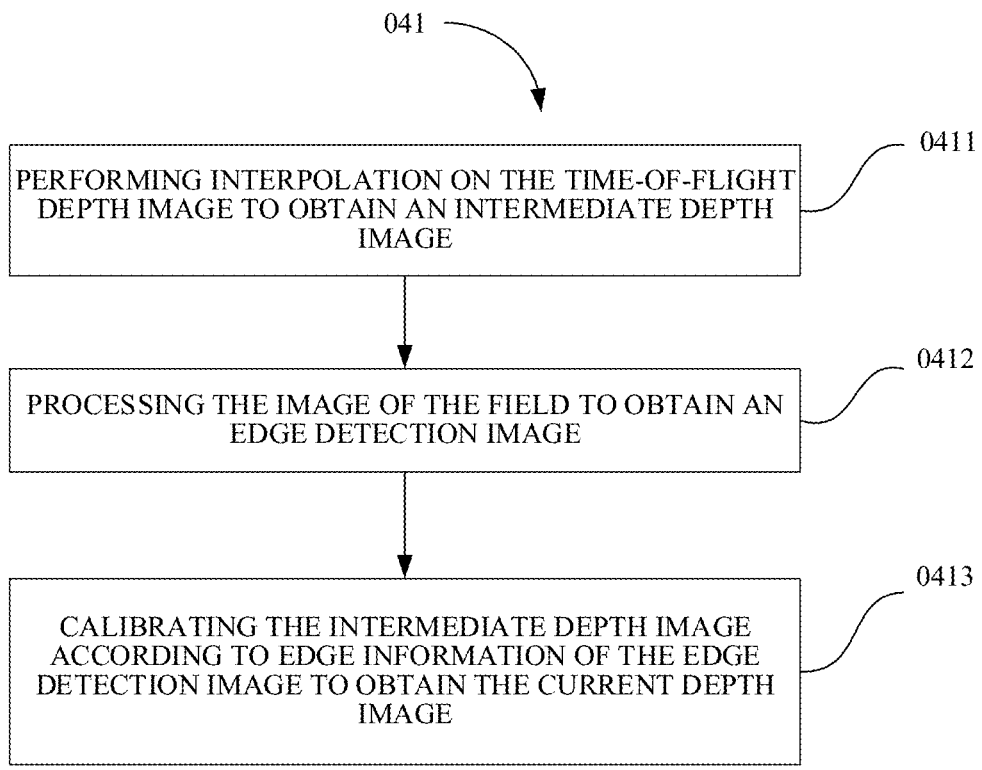
FIG. 9 is a schematic flow chart illustrating a method for depth image acquisition according to implementations.

Referring to FIG. 9, in some implementations, the time-of-flight depth image is up-sampled (i.e., the operation 041) to obtain the current depth image as follows.

At 0411, interpolation is performed on the time-of-flight depth image to obtain an intermediate depth image.

At 0412, the image of the field is processed to obtain an edge detection image.

At 0413, the intermediate depth image is calibrated according to edge information of the edge detection image to obtain the current depth image.

Figure 10:
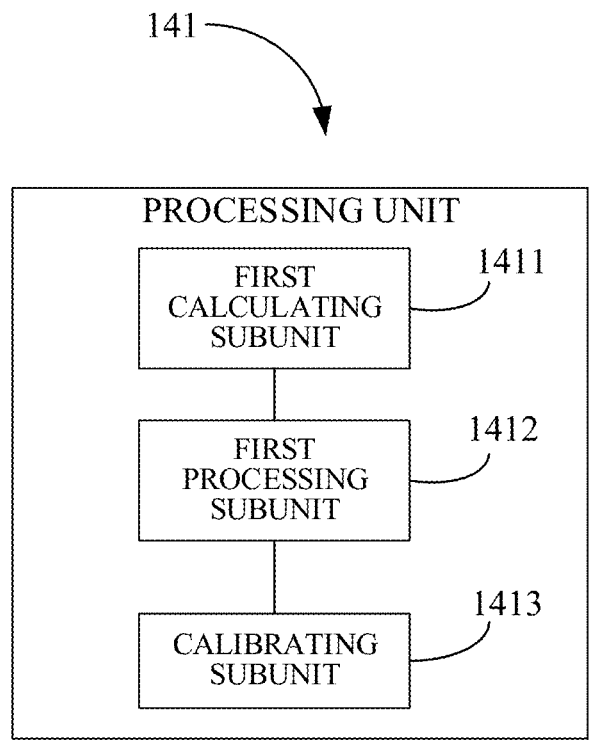
FIG. 10 is a schematic structural diagram illustrating a processing unit of a device for depth image acquisition according to implementations.

Referring to FIG. 10, in some examples, the processing unit 141 includes a first calculating subunit 1411, a first processing subunit 1412, and a calibrating subunit 1413. The operation 0411 can be implemented by the first calculating subunit 1411. The operation 0412 may be performed by the first processing subunit 1412. The operation 0413 can be implemented by the calibrating subunit 1413. That is, the first calculating subunit 1411 is configured to perform interpolation on the time-of-flight depth image to obtain the intermediate depth image. The first processing subunit 1412 is configured to process the image of the field to obtain the edge detection image. The calibrating subunit 1413 is configured to calibrate the intermediate depth image according to the edge information of the edge detection image to obtain the current depth image.

Referring to FIG. 3, in some implementations, the operations 0411, 0412, and 0413 can be performed by the processor 40. That is, the processor 40 is further configured to perform interpolation on the time-of-flight depth image to obtain the intermediate depth image, process the image of the field to obtain the edge detection image, and calibrate the intermediate depth image according to the edge information of the edge detection image to obtain the current depth image.

Figure 11:
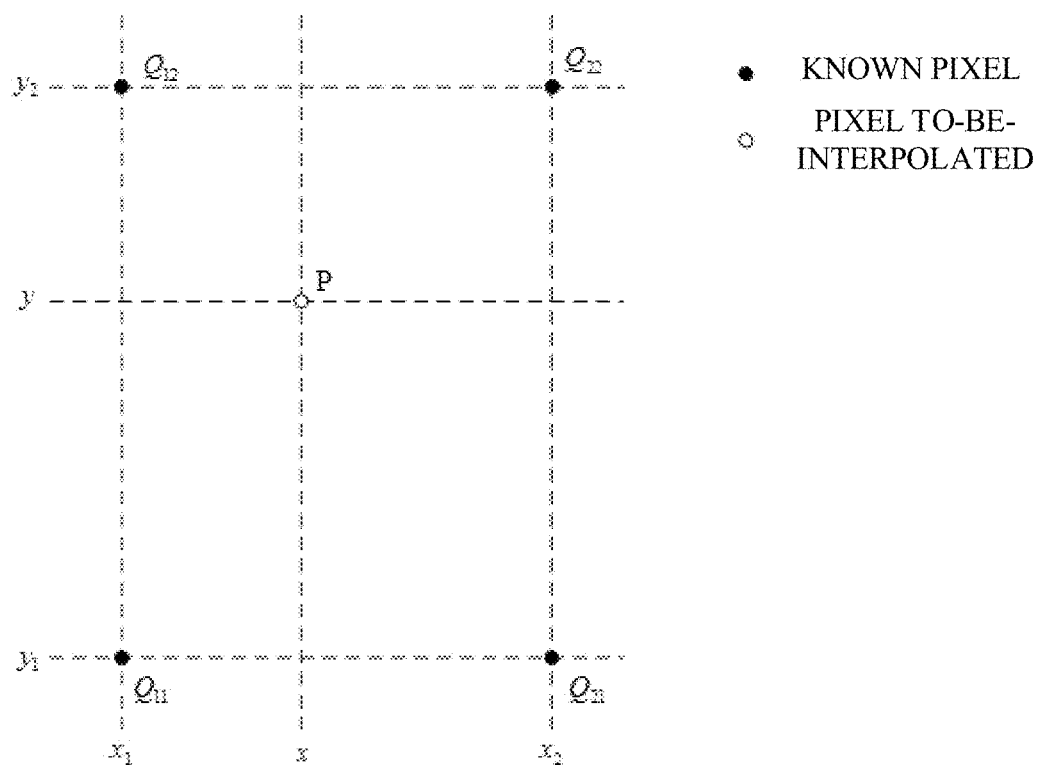
FIG. 11 is a schematic diagram illustrating the principle of bilinear interpolation in a method for depth image acquisition according to implementations.

In an example, the processor 40 can perform interpolation on the time-of-flight depth image according to interpolation algorithms such as the nearest neighbor interpolation, bilinear interpolation, and trilinear interpolation, to obtain the intermediate depth image. The following takes the bilinear interpolation as an example for illustration. Referring to FIG. 11, assume that a pixel to-be-interpolated is P(x, y), four pixels with known coordinates adjacent to the pixel to-be-interpolated P are respectively: $Q_{11}$ ($x_1$, $y_1$) $Q_{12}$=($x_1$, $y_2$) $Q_{21}$=($x_2$, $y_1$) $Q_{22}$=($x_2$, $y_2$). First, linear interpolation is performed in the horizontal direction x to obtain:

$$\begin{cases} f(x, y_1) \approx \frac{x_2 - x}{x_2 - x_1} f(Q_{11}) + \frac{x - x_1}{x_2 - x_1} f(Q_{21}) \\ f(x, y_2) \approx \frac{x_2 - x}{x_2 - x_1} f(Q_{12}) + \frac{x - x_1}{x_2 - x_1} f(Q_{22}) \end{cases},$$

and then linear interpolation is performed in the vertical direction y to obtain:

$$f(P) \approx \frac{y_2 - y}{y_2 - y_1} f(x, y_1) + \frac{y - y_1}{y_2 - y_1} f(x, y_2),$$

so depth data f(x, y) of pixel P is:

$$f(x, y) \approx$$
$$\frac{f(Q_{11})}{(x_2 - x_1)(y_2 - y_1)}(x_2 - x)(y_2 - y) + \frac{f(Q_{21})}{(x_2 - x_1)(y_2 - y_1)}(x - x_1)(y_2 - y) +$$
$$\frac{f(Q_{12})}{(x_2 - x_1)(y_2 - y_1)}(x - x_1)(y - y_1) + \frac{f(Q_{22})}{(x_2 - x_1)(y_2 - y_1)}(x - x_1)(y_1 - y)$$

In the intermediate depth image obtained by up-sampling, since the up-sampled pixels are obtained by weighted average of depth data of adjacent pixels using various manners, the difference in depth data of pixels at the boundary will inevitably be reduced, resulting in blurred boundary. In this case, the processor 40 needs to calibrate the depth data of the pixels at the boundary.

Figure 12:
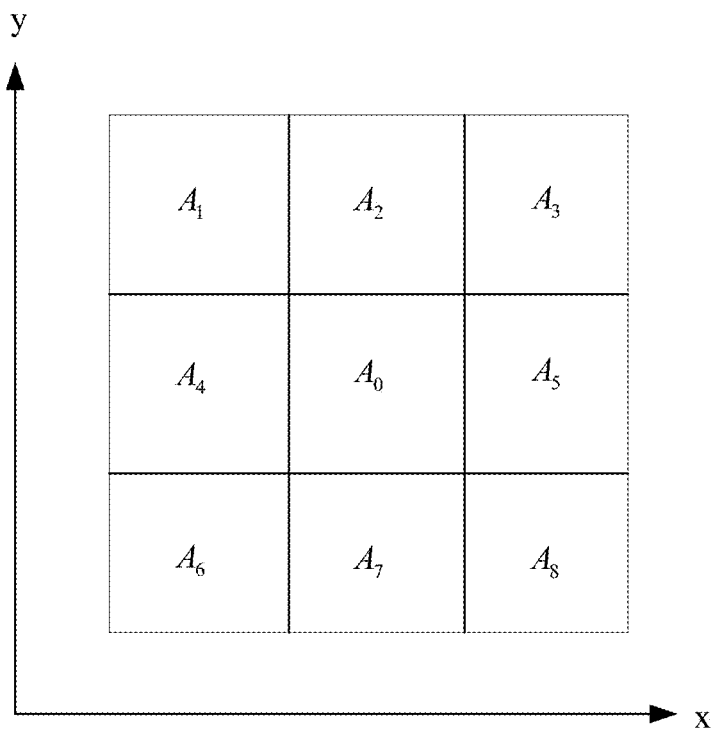
FIG. 12 is a schematic diagram illustrating the principle of selecting pixels located at the geometric boundary of an object in a method for depth image acquisition according to implementations.

In an example, the processor 40 may first use an edge detection algorithm to detect the edge of the image of the field to obtain the edge detection image. The edge detection algorithm mainly adopts gradient information of a pixel in the image of the field to determine whether the pixel is a boundary pixel. It is generally believed that the larger a gradient value of a pixel, the greater a probability that this pixel is a boundary pixel. But sometimes some pixels with larger gradient values are not necessarily boundary pixels. The boundary pixels determined based on the gradient values generally may belong to the geometric boundary of the object and/or the boundary of the image texture (the texture belongs to a plane). In the intermediate depth image, depth data of pixels of the image texture is not much different, and there will be a sudden change in the depth data only at the junction of objects or the junction of the foreground object and the background. Herein, what is to be calibrated is depth data of pixels at the geometric boundary of the object in the intermediate depth image. Therefore, the processor 40 needs to select, from all pixels belonging to the boundary pixels in the edge detection image, pixels that belong to the geometric boundary of the object. In an example, referring to FIG. 12, suppose that a pixel belonging to the boundary pixels in the edge detection image is A, a pixel corresponding to the pixel A in the intermediate depth image is A0, and pixels in a region of N×N (taking N=3 as an example) with A0 as the center point in the intermediate depth image include A1, A2, A3, A4, A5, A6, A7, and A8. To determine whether pixel A is a pixel that belongs to the geometric boundary of the object, it is necessary to detect whether there is a sudden change in depth of A0 in any one of the horizontal direction, the vertical direction, or the diagonal direction. In other words, the processor 40 can obtain whether there is at least one value in |A1−A|, |A2−A|, |A3−A|, |A4−A|, |A5−A|, |A6−A|, |A7−A|, and |A8−A| that is greater than a change threshold. If at least one value is greater than the change threshold, for example, the value of |A4−A| is greater than the change threshold, there is a sudden change in A0 in the horizontal direction. Correspondingly, A and some pixels in the same horizontal direction x as A are used to calibrate depth data of A0. In this way, by calibrating the intermediate depth image according to the above calibration manner, the calibrated current depth image can be obtained. Compared with the intermediate depth image, definition of the boundary of the current depth image is higher.

Figure 13:
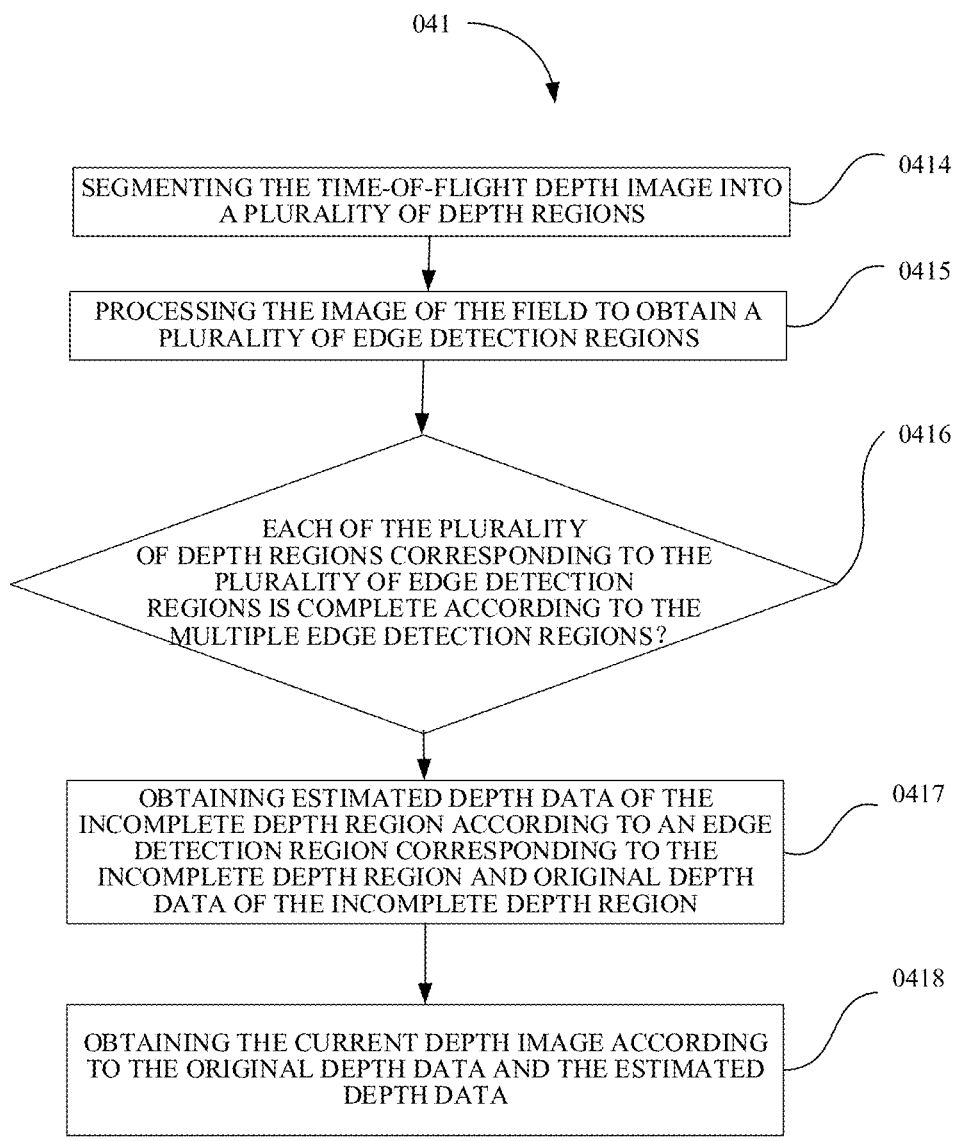
FIG. 13 is a schematic flow chart illustrating a method for depth image acquisition according to implementations.

Referring to FIG. 13, in some implementations, the time-of-flight depth image is up-sampled (i.e., the operation 041) to obtain the current depth image as follows.

At 0414, the time-of-flight depth image is segmented into multiple depth regions.

At 0415, the image of the field is processed to obtain multiple edge detection regions.

At 0416, determine whether each of the multiple depth regions corresponding to the multiple edge detection regions is complete according to the multiple edge detection regions.

At 0417, based on a determination that any depth region is incomplete, estimated depth data of the incomplete depth region is obtained according to an edge detection region corresponding to the incomplete depth region and original depth data of the incomplete depth region.

At 0418, the current depth image is obtained according to the original depth data and the estimated depth data.

Figure 14:
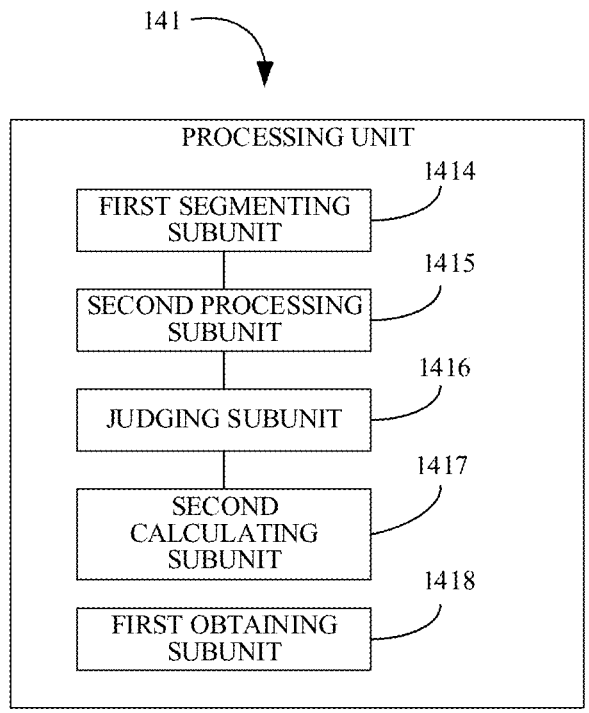
FIG. 14 is a schematic structural diagram illustrating a processing unit of a device for depth image acquisition according to implementations.

Referring to FIG. 14, in some examples, the processing unit 141 includes a first segmenting subunit 1414, a second processing subunit 1415, a judging subunit 1416, a second calculating subunit 1417, and a first obtaining subunit 1418. The operation 0414 can be implemented by the first segmenting subunit 1414. The operation 0415 can be implemented by the second processing subunit 1415. The operation 0416 can be implemented by the judging subunit 1416. The operation 0417 can be implemented by the second calculating subunit 1417. The operation 0418 can be implemented by the first obtaining subunit 1418. That is, the first segmenting subunit 1414 is configured to segment the time-of-flight depth image into the multiple depth regions. The second processing subunit 1415 is configured to process the image of the field to obtain the multiple edge detection regions. The judging subunit 1416 is configured to determine whether each of the multiple depth regions corresponding to the multiple edge detection regions is complete according to the multiple edge detection regions. The second calculating subunit 1417 is configured to, when any depth region is incomplete, obtain the estimated depth data of the incomplete depth region according to an edge detection region corresponding to the incomplete depth region and the original depth data of the incomplete depth region. The first obtaining subunit 1418 is configured to obtain the current depth image according to the original depth data and the estimated depth data.

Referring to FIG. 3, in some implementations, the operations 0414, 0415, 0416, 0417, and 0418 can be implemented by the processor 40. That is, the processor 40 can be further configured to segment the time-of-flight depth image into the multiple depth regions, process the image of the field to obtain the multiple edge detection regions, determine whether each of the multiple depth regions corresponding to the multiple edge detection regions is complete according to the multiple edge detection regions, when any depth region is incomplete, obtain the estimated depth data of the incomplete depth region according to an edge detection region corresponding to the incomplete depth region and the original depth data of the incomplete depth region, and obtain the current depth image according to the original depth data and the estimated depth data.

In an example, the processor 40 first segments the time-of-flight depth image into the multiple depth regions based on original depth data of the time-of-flight depth image. For example, the time-of-flight depth image is segmented into a foreground depth region, a middle ground depth region, a background depth region, and so on. The processor 40 further performs edge detection on the image of the field by using an edge detection algorithm to obtain an edge detection image and segment the edge detection image into the multiple edge detection regions in one-to-one correspondence with the multiple depth regions. For example, the edge detection image is segmented into a foreground edge detection region corresponding to the foreground depth region, a middle ground edge detection region corresponding to the middle ground depth region, and a background edge detection region corresponding to the background depth region. Thereafter, the processor 40 determines whether each depth region is complete. Taking the foreground depth region as an example, the processor 40 may compare the contour of the foreground depth region with the contour of the foreground edge detection region. If the consistency (or called degree of matching) between the contour of the foreground depth region and the contour of the foreground edge detection region is relatively high, the foreground depth region is not up-sampled. If the consistency between the contour of the foreground depth region and the contour of the foreground edge detection region is low, the foreground depth region is up-sampled. Generally, the time-of-flight depth image has low resolution but the image of the field has high resolution. Therefore, the consistency between the contour of the depth region and the contour of the edge detection region will not be very high. Compared with the edge detection region, the depth region usually misses some information. In this case, the processor 40 may determine a missing part of the depth region according to the comparison result of the depth region and the edge detection region and estimate depth data of the missing part based on the original depth data of the depth region to obtain the estimated depth data. In this way, the missing part of the depth region is filled, so that the contour of the depth region after adding the estimated depth data and the contour of the edge detection region have a higher consistency. The calculation of the estimated depth data is the above up-sampling, where an interpolation algorithm can be used, for example, obtained by the bilinear interpolation algorithm described in operation 0411, which will not be repeated herein. In this way, for each incomplete depth region, the estimated depth data is obtained, and the missing part of each depth region is filled. The final current depth image obtained contains both the original depth data and the estimated depth data. The newly added estimated depth data increases the data volume of the current depth image and improves the resolution of the current depth image, so that the current depth image can meet the requirements of various scenarios.

Figure 15:
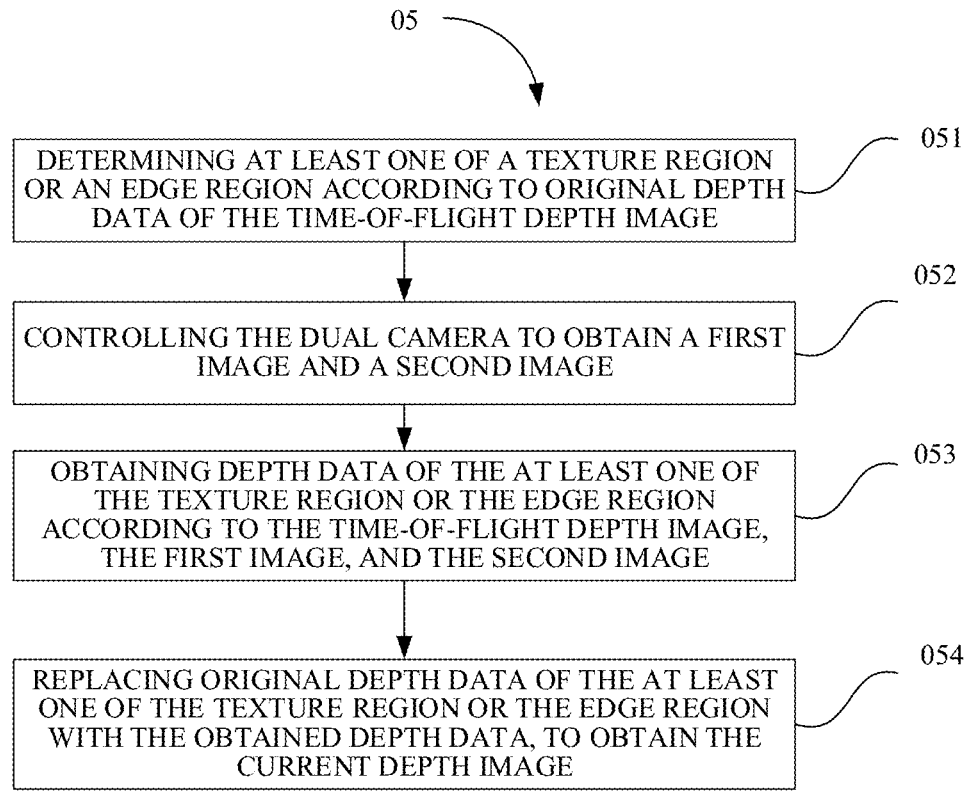
FIG. 15 is a schematic flow chart illustrating a method for depth image acquisition according to implementations.

Referring to FIG. 15, in some implementations, both the dual camera 30 and the time-of-flight depth camera 20 are controlled (i.e., the operation 05) to obtain the current depth image of the field based on a determination that the current distance is not greater than the first distance as follows.

At 051, at least one of a texture region or an edge region is determined according to original depth data of the time-of-flight depth image.

At 052, the dual camera 30 is controlled to obtain a first image and a second image.

At 053, depth data of the at least one of the texture region or the edge region is obtained according to the time-of-flight depth image, the first image, and the second image.

At 054, original depth data of the at least one of the texture region or the edge region is replaced with the obtained depth data, to obtain the current depth image.

Figure 16:
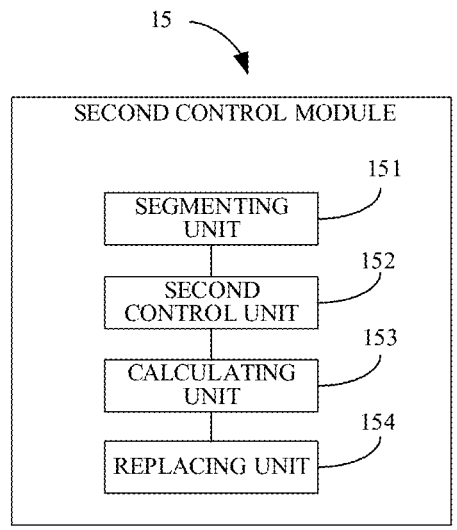
FIG. 16 is a schematic structural diagram illustrating a second control module of a device for depth image acquisition according to implementations.

Referring to FIG. 16, in some examples, the second control module 15 includes a segmenting unit 151, a second control unit 152, a calculating unit 153, and a replacing unit 154. The operation 051 can be implemented by the segmenting unit 151. The operation 052 can be implemented by the second control unit 152. The operation 053 can be implemented by the calculating unit 153. The operation 054 can be implemented by the replacing unit 154. That is, the segmenting unit 151 is configured to determine the at least one of the texture region or the edge region according to the original depth data of the time-of-flight depth image. The second control unit 152 is configured to control the dual camera 30 to obtain the first image and the second image. The calculating unit 153 is configured to obtain the depth data of the at least one of the texture region or the edge region according to the time-of-flight depth image, the first image, and the second image. The replacing unit 154 is configured to replace the original depth data of the at least one of the texture region or the edge region with the obtained depth data, to obtain the current depth image.

Referring to FIG. 3, in some implementations, the operations 051, 052, 053, and 054 can be implemented by the processor 40. That is, the processor 40 is configured to determine the at least one of the texture region or the edge region according to the original depth data of the time-of-flight depth image, control the dual camera 30 to obtain the first image and the second image, obtain the depth data of the at least one of the texture region or the edge region according to the time-of-flight depth image, the first image, and the second image, and replace the original depth data of the at least one of the texture region or the edge region with the obtained depth data to obtain the current depth image.

Referring to FIG. 3, in some implementations, the operations 051, 053, and 054 can be implemented by the processor 40. The operation 052 can be implemented by the dual camera 30. That is, the processor 40 is further configured to determine the at least one of the texture region or the edge region according to the original depth data of the time-of-flight depth image. The dual camera 30 is configured to capture the first image and the second image. The processor 40 is further configured to obtain the depth data of the at least one of the texture region or the edge region according to the time-of-flight depth image, the first image, and the second image and replace the original depth data of the at least one of the texture region or the edge region with the obtained depth data to obtain the current depth image.

In the operation 051, only the edge region or only the texture region can be determined or both the edge region and the texture region can be determined. Correspondingly, when only the edge region is determined in the operation 051, only depth data of the edge region is obtained in the operation 053 and only original depth data of the edge region is replaced with the obtained depth data in the operation 054. When only the texture region is determined in the operation 051, only depth data of the texture region is obtained in the operation 053 and only original depth data of the texture region is replaced with the obtained depth data in the operation 054. When both the edge region and the texture region are determined in the operation 051, depth data of both the edge region and the texture region are obtained in the operation 053 and original depth data of both the edge region and the texture region are replaced with the obtained depth data in the operation 054.

In an example, for a time-of-flight depth image, the difference in original depth data of multiple pixels in the edge region is relatively large, and the difference in original depth data of multiple pixels in the texture region is smaller than the difference in the original depth data of the multiple pixels in the edge region. Therefore, the edge region can be determined by setting a suitable first determination threshold and the texture region can be determined by setting a suitable second determination threshold, where the first determination threshold is greater than the second determination threshold. In the determining process, original depth data of each pixel in the time-of-flight depth image is subtracted from original depth data of adjacent upper, lower, left, and right pixels, to obtain four differences. If any one of the four differences is greater than or equal to the first determination threshold, the pixel is marked as a pixel in the edge region. If the four differences are all less than the first determination threshold and any one of the four differences is greater than or equal to the second determination threshold, the pixel is marked as a pixel in the texture region. If the four differences are all less than the second determination threshold, the pixel is marked as a pixel in the smooth region. In this way, one or more edge regions and one or more texture regions can be obtained, where each edge region includes at least one pixel and each texture region includes at least one pixel. The processor 40 further controls the first camera 31 to take the first image and controls the second camera 32 to take the second image. The processor 40 further determines, in the first image, an edge region and a texture region corresponding to the edge region and the texture region in the time-of-flight depth image according to a correspondence between the time-of-flight depth camera 20 and the first camera 31. The processor 40 further finds, in the second image, a target matched pixel that matches the to-be-compared pixel in the edge region and the texture region in the first image. The processor 40 further obtains the depth data of the edge region and the texture region in the time-of-flight depth image according to the pixel to-be-compared and the target matched pixel. Finally, the processor 40 replaces the original depth data of the texture region and the edge region in the time-of-flight depth image with the obtained depth data to obtain the current depth image. In this way, the current depth image contains both the original depth data measured by the time-of-flight depth camera 20 and the obtained depth data measured by the dual camera 30. The smooth region in the current depth image contains the original depth data measured by the time-of-flight depth camera 20 and the edge region and the texture region contain the obtained depth data measured by the dual camera 30. As such, accuracy of the depth data of the smooth region, the edge region, and the texture region can be higher.

Figure 17:
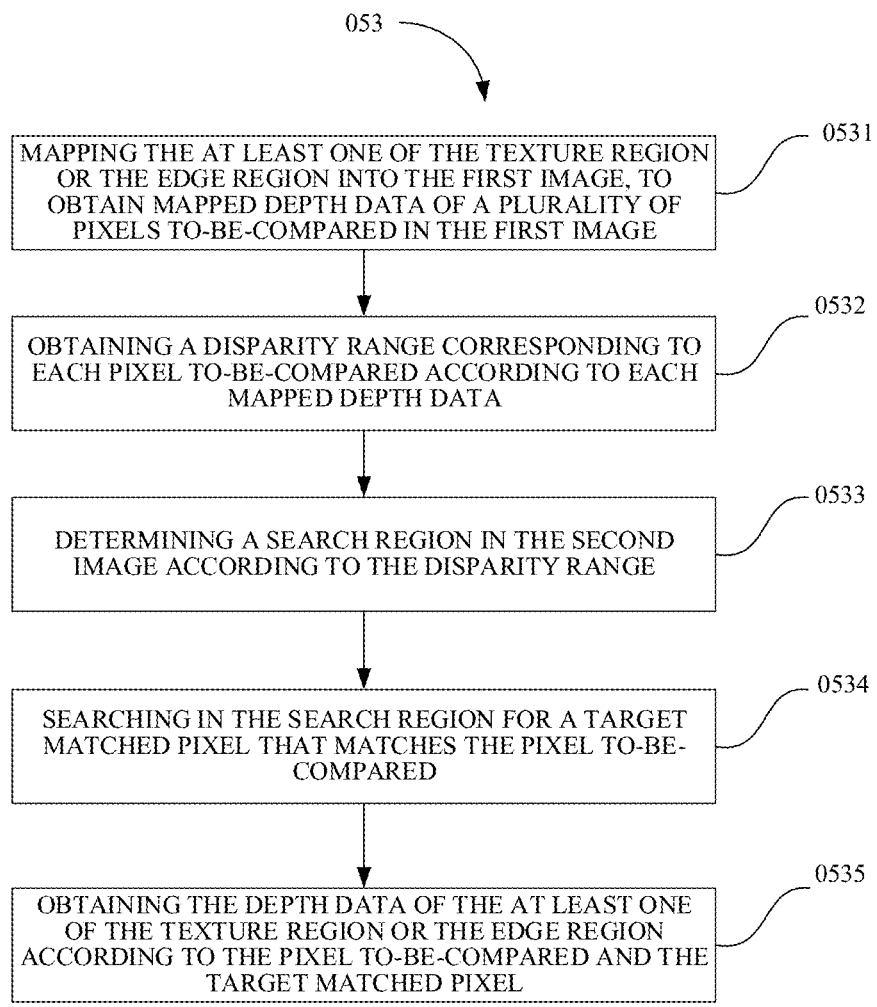
FIG. 17 is a schematic flow chart illustrating a method for depth image acquisition according to implementations.

Referring to FIG. 17, in some implementations, the depth data of the at least one of the texture region or the edge region is obtained (i.e., the operation 053) according to the time-of-flight depth image, the first image, and the second image as follows.

At 0531, the at least one of the texture region or the edge region is mapped into the first image, to obtain mapped depth data of multiple pixels to-be-compared in the first image.

At 0532, a disparity range corresponding to each pixel to-be-compared is obtained according to each mapped depth data.

At 0533, a search region is determined in the second image according to the disparity range.

At 0534, search in the search region for a target matched pixel that matches the pixel to-be-compared.

At 0535, the depth data of the at least one of the texture region or the edge region is obtained according to the pixel to-be-compared and the target matched pixel.

Figure 18:
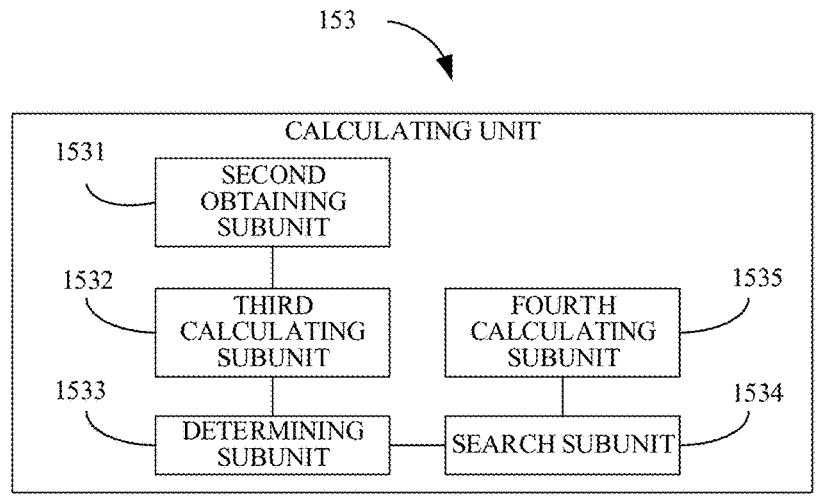
FIG. 18 is a schematic structural diagram illustrating a calculating unit of a device for depth image acquisition according to implementations.

Referring to FIG. 18, in some examples, the calculating unit 153 includes a second obtaining subunit 1531, a third calculating subunit 1532, a determining subunit 1533, a search subunit 1534, and a fourth calculating subunit 1535. The operation 0531 can be implemented by the second obtaining subunit 1531. The operation 0532 can be implemented by the third calculating subunit 1532. The operation 0533 can be implemented by the determining subunit 1533. The operation 0534 can be implemented by the search subunit 1534. The operation 0535 can be implemented by the fourth calculating subunit 1535. That is, the second obtaining subunit 1531 is configured to map the at least one of the texture region or the edge region into the first image, to obtain the mapped depth data of the multiple pixels to-be-compared in the first image. The third calculating subunit 1532 is configured to obtain the disparity range corresponding to each pixel to-be-compared according to each mapped depth data. The determining subunit 1533 is configured to determine the search region in the second image according to the disparity range. The search subunit 1534 is configured to search in the search region for the target matched pixel that matches the pixel to-be-compared. The fourth calculating subunit 1535 is configured to obtain the depth data of the at least one of the texture region or the edge region according to the pixel to-be-compared and the target matched pixel.

Referring to FIG. 3, in some implementations, the operations 0531, 0532, 0533, 0534, and 0535 can be implemented by the processor 40. That is, the processor 40 is further configured to map the at least one of the texture region or the edge region into the first image to obtain the mapped depth data of the multiple pixels to-be-compared in the first image, obtain the disparity range corresponding to each pixel to-be-compared according to each mapped depth data, determine the search region in the second image according to the disparity range, search in the search region for the target matched pixel that matches the pixel to-be-compared, and obtain the depth data of the at least one of the texture region or the edge region according to the pixel to-be-compared and the target matched pixel.

In an example, for a parallel dual camera 30 (that is, optical axes of both the first camera 31 and the second camera 32 are perpendicular to the baseline between the first camera 31 and the second camera 32), in the case of no disparity constraint, for a pixel to-be-compared in the i-th row in the first image, to find in the second image a target matched pixel that matches the pixel to-be-compared, it is necessary to find the target matched pixel among W pixels in the i-th row in the second image. This will increase the calculation time of the depth data and the calculation amount of the processor 40. In the implementation, the processor 40 first determines in the first image an edge region and a texture region corresponding to the edge region and the texture region in the time-of-flight depth image according to the correspondence between the time-of-flight depth camera 20 and the first camera 31. The original depth data of the edge region and the texture region in the time-of-flight depth image are mapped to the first image to obtain the mapped depth data of the edge region and the texture region in the first image. For each pixel to-be-compared in the edge region and the texture region in the first image, a disparity range corresponding to the pixel to-be-compared is obtained according to the mapped depth data of each pixel to-be-compared. That is, $$d_1 = \frac{BF}{z+\delta} \text{ and } d_2 = \frac{BF}{z-\delta},$$

where B is the baseline length, F is the equivalent focal length of the first camera 31, z is the mapped depth data of the pixel to-be-compared, δ is the ranging accuracy of the time-of-flight depth camera 20, and $d_1$ and $d_2$ are the two boundary values of the disparity range. In this way, after the disparity range is determined, multiple pixels within $[d_1, d_2]$ can be determined in the second image and a region where the multiple pixels are located is the search region. After the processor 40 finds in the search region the target matched pixel that matches the pixel to-be-compared, it can obtain the depth data according to coordinate data of the pixel to-be-compared and the target matched pixel. As such, the search range can be narrowed based on the disparity constraint, the amount of data processed by the processor 40 can be reduced, and calculation of the depth data can be accelerated.

In some examples, before the operation 053, the time-of-flight depth image can be up-sampled, so that the resolution of the time-of-flight depth image is the same as the resolution of the first image, which facilitates subsequent mapping and replacement of the depth data.

Figure 19:
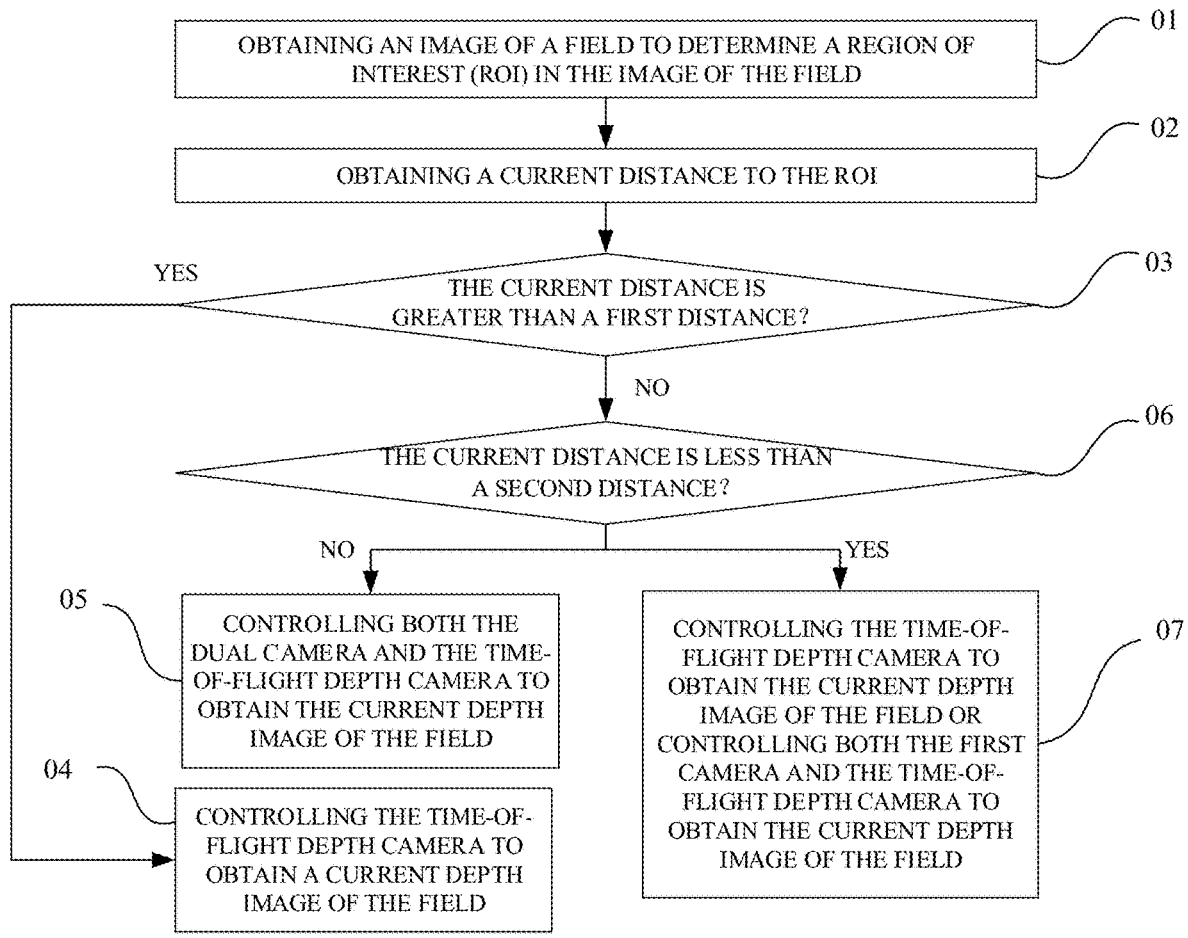
FIG. 19 is a schematic flow chart illustrating a method for depth image acquisition according to implementations.

Referring to FIG. 19, in some implementations, the first camera 31 includes multiple phase-detection pixels. The method further includes the following.

At 06, whether the current distance is less than a second distance is determined, where the second distance is less than the first distance.

At 07, the time-of-flight depth camera 20 is controlled to obtain the current depth image of the field or both the first camera 31 and the time-of-flight depth camera 20 are controlled to obtain the current depth image of the field, based on a determination that the current distance is less than the second distance.

Figures 20, 21:
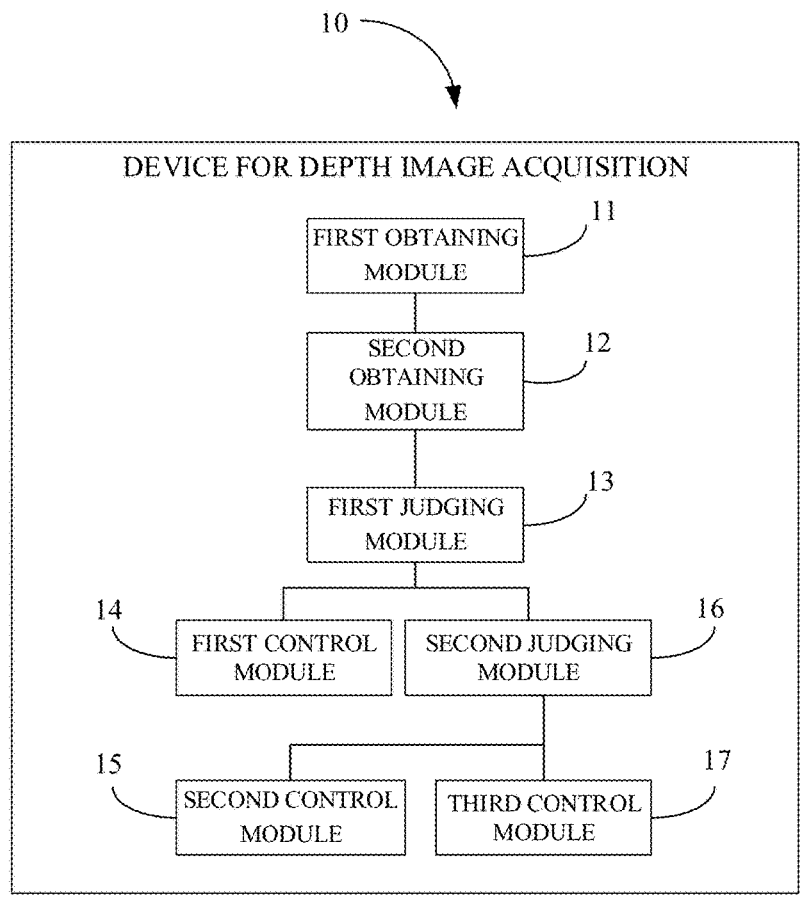
FIG. 20 is a schematic structural diagram illustrating a device for depth image acquisition according to implementations.
FIG. 21 is a schematic flow chart illustrating a method for depth image acquisition according to implementations.

Referring to FIG. 20, in some examples, the device for image acquisition further includes a second judging module 16 and a third control module 17. The operation 06 can be implemented by the second judging module 16. The operation 07 can be implemented by the third control module 17. That is, the second judging module 16 is configured to determine whether the current distance is less than the second distance, where the second distance is less than the first distance. The third control module 17 is configured to control the time-of-flight depth camera 20 to obtain the current depth image of the field or control both the first camera 31 and the time-of-flight depth camera 20 to obtain the current depth image of the field, when the current distance is less than the second distance.

Referring to FIG. 3, in some implementations, the operations 06 and 07 can be implemented by the processor 40. That is, the processor 40 is further configured to determine whether the current distance is less than the second distance, where the second distance is less than the first distance, and control the time-of-flight depth camera 20 to obtain the current depth image of the field or control both the first camera 31 and the time-of-flight depth camera 20 to obtain the current depth image of the field, when the current distance is less than the second distance.

Referring to FIG. 3, in some implementations, the operation 06 can be implemented by the processor 40. The operation 07 can be implemented by the time-of-flight depth camera 20, the first camera 31, and the processor 40. That is, the processor 40 is further configured to determine whether the current distance is less than the second distance, where the second distance is less than the first distance. Both the time-of-flight depth camera 20 and the processor 40 are configured to obtain the current depth image of the field or all the first camera 31, the time-of-flight depth camera 20, and the processor 40 are configured to obtain the current depth image of the field, when the current distance is less than the second distance.

The phase-detection pixels are dispersedly distributed in the image sensor of the first camera 31. The number of phase-detection pixels can be determined according to requirements on the resolution of the current depth image. Multiple phase-detection pixels can be used to measure the depth of the field. In an example, each phase-detection pixel generates an electric signal when receiving incident visible light and the electric signal varies with the incident angle of the visible light. For each pair of phase-detection pixels used to measure the depth of the field, the incident angles of visible light incident on the two phase-detection pixels are different. Correspondingly, the two phase-detection pixels will output different electrical signals. Therefore, the depth of the field can be obtained based on the phase difference between the electrical signals of the two phase-detection pixels.

In the method of the implementations, when the current distance is less than the first distance, the processor 40 further determines whether the current distance is less than the second distance. If the current distance is less than the first distance and greater than the second distance, the processor 40 controls both the dual camera 30 and the time-of-flight depth camera 20 to acquire the current depth image. If the current distance is less than the second distance, the processor 40 controls the time-of-flight depth camera 20 to acquire the current depth image of the field or controls both the first camera 31 and the time-of-flight depth camera 20 to acquire the current depth image of the field. The first distance may be in the range of [1.5 m, 2.5 m], for example, the first distance is 1.5 m, 1.85 m, 2 m, 2.24 m, 2.3 m, 2.5 m, etc. The second distance may be in the range of [25 cm, 35 cm], for example, the second distance is 25 cm, 27.6 cm, 29 cm, 30 cm, 31.5 cm, 33 cm, 35 cm, etc.

Referring to FIG. 21, in some implementations, control (i.e., the operation 07) the time-of-flight depth camera 20 to obtain the current depth image of the field or both the first camera 31 and the time-of-flight depth camera 20 to obtain the current depth image of the field, based on a determination that the current distance is less than the second distance as follows.

At 071, ambient brightness of the field is obtained.

At 072, both the first camera 31 and the time-of-flight depth camera 20 are controlled to obtain the current depth image of the field when the ambient brightness is greater than preset brightness.

At 073, the time-of-flight depth camera 20 is controlled to obtain the current depth image of the field when the ambient brightness is less than the preset brightness.

Figure 22:
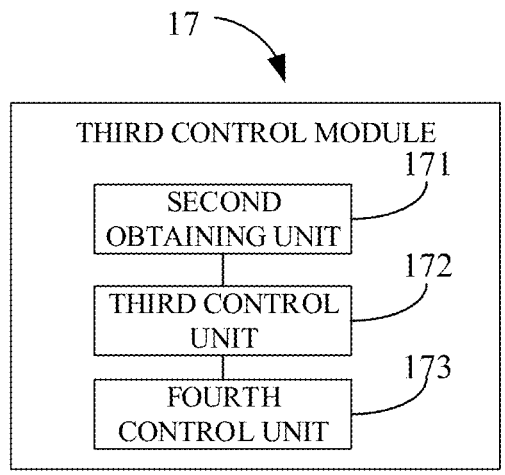
FIG. 22 is a schematic structural diagram illustrating a third control module of a device for depth image acquisition according to implementations.

Referring to FIG. 22, in some examples, the third control module 17 includes a second obtaining unit 171, a third control unit 172, and a fourth control unit 173. The operation 071 can be implemented by the second obtaining unit 171. The operation 072 can be implemented by the third control unit 172. The operation 073 can be implemented by the fourth control unit 173. That is, the second obtaining unit 171 is configured to obtain the ambient brightness of the field. The third control unit 172 is configured to control both the first camera 31 and the time-of-flight depth camera 20 to obtain the current depth image of the field when the ambient brightness is greater than the preset brightness. The fourth control unit 173 is configured to control the time-of-flight depth camera 20 to obtain the current depth image of the field when the ambient brightness is less than the preset brightness.

Referring to FIG. 3, in some implementations, the operations 071, 072, and 073 all can be implemented by the processor 40. That is, the processor 40 is configured to obtain the ambient brightness of the field, control both the first camera 31 and the time-of-flight depth camera 20 to obtain the current depth image of the field when the ambient brightness is greater than the preset brightness, and control the time-of-flight depth camera 20 to obtain the current depth image of the field when the ambient brightness is less than the preset brightness.

Referring to FIG. 3, in some implementations, the electronic device 100 further includes a light sensor 70. The operation 071 can be implemented by the light sensor 70. The operation 072 can be implemented by the first camera 31, the time-of-flight depth camera 20, and the processor 40. The operation 073 can be implemented by the time-of-flight depth camera 20 and the processor 40. That is, the light sensor 70 is configured to obtain ambient brightness of the field. All the first camera 31, the time-of-flight depth camera 20, and the processor 40 are configured to obtain the current depth image of the field when the ambient brightness is greater than the preset brightness. Both the time-of-flight depth camera 20 and the processor 40 are configured to obtain the current depth image of the field when the ambient brightness is less than the preset brightness.

In an example, the light sensor 70 disposed on the housing 50 detects the ambient brightness of the field. The processor 40 obtains the ambient brightness from the light sensor 70. The processor 40 further determines whether the ambient brightness is greater than the preset brightness. When the ambient brightness is greater than the preset brightness, it means that the ambient brightness is high and the light is sufficient. In this case, both the first camera 31 and the time-of-flight depth camera 20 can be used to obtain the current depth image of the field. When the ambient brightness is less than the preset brightness, it means that the ambient brightness is low and the light is insufficient. That is, small amount of light is incident on the two phase-detection pixels of the pair of phase-detection pixels. Correspondingly, there may be little difference between the two electrical signals output by the two phase-detection pixels, and thus the depth of the field is unable to be obtained based on the phase difference or the obtained depth of the field has very low accuracy. In this case, the time-of-flight depth camera 20 is used to obtain the current depth image alone, so as to improve the accuracy of the current depth image. In the case that the time-of-flight depth camera 20 is used to obtain the current depth image, the current depth image is also obtained by up-sampling the time-of-flight depth image and the up-sampling will not be repeated herein.

Figure 23:
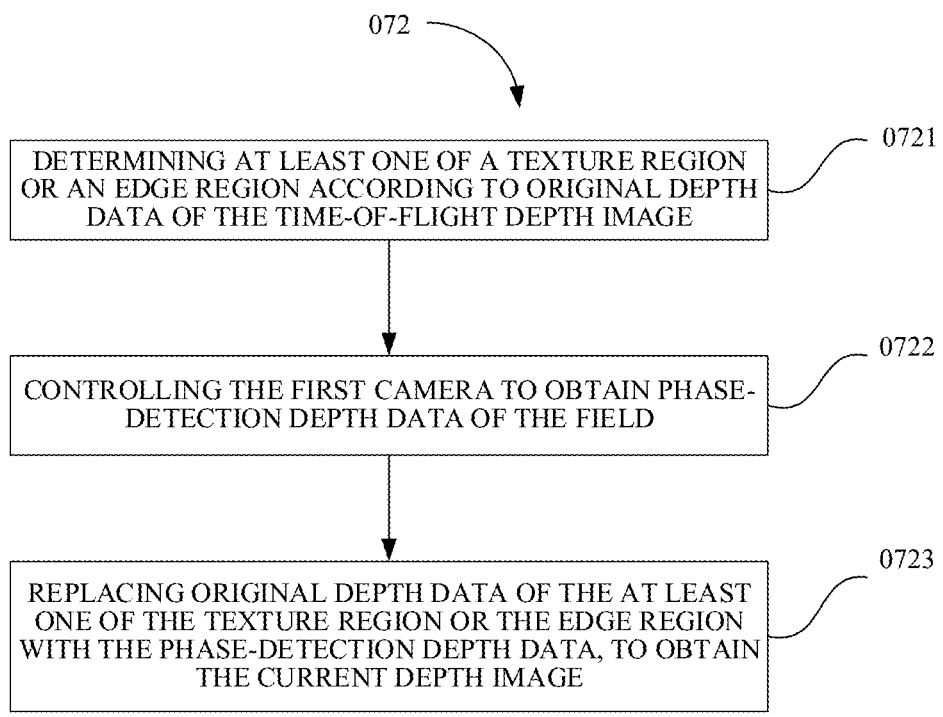
FIG. 23 is a schematic flow chart illustrating a method for depth image acquisition according to implementations.

Referring to FIG. 23, in some implementations, both the first camera 31 and the time-of-flight depth camera 20 are controlled (i.e., the operation 072) to obtain the current depth image of the field when the ambient brightness is greater than the preset brightness as follows.

At 0721, at least one of a texture region or an edge region is determined according to original depth data of the time-of-flight depth image.

At 0722, the first camera 31 is controlled to obtain phase-detection depth data of the field.

At 0723, original depth data of the at least one of the texture region or the edge region is replaced with the phase-detection depth data, to obtain the current depth image.

Figure 24:
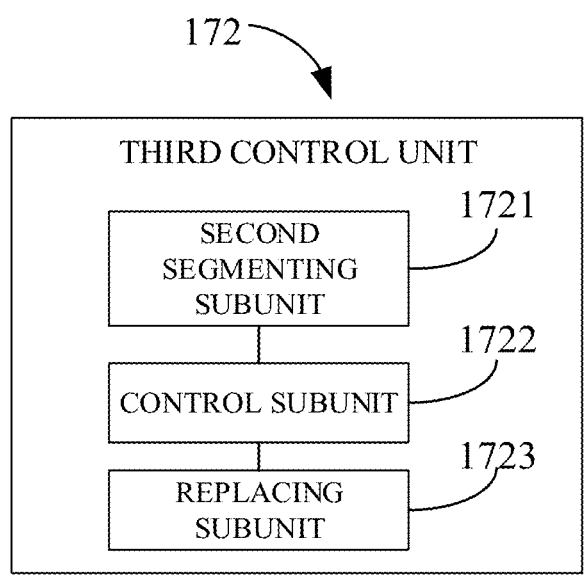
FIG. 24 is a schematic structural diagram illustrating a second control unit of a device for depth image acquisition according to implementations.

Referring to FIG. 24, in some examples, the third control unit 172 includes a second segmenting subunit 1721, a control subunit 1722, and a replacing subunit 1723. The operation 0721 can be implemented by the second segmenting subunit 1721. The operation 0272 can be implemented by the control subunit 1722. The operation 0723 can be implemented by the replacing subunit 1723. That is, the second segmenting subunit 1721 is configured to determine the at least one of the texture region or the edge region according to the original depth data of the time-of-flight depth image. The control subunit 1722 is configured to control the first camera 31 to obtain the phase-detection depth data of the field. The replacing subunit 1723 is configured to replace the original depth data of the at least one of the texture region or the edge region with the phase-detection depth data, to obtain the current depth image.

Referring to FIG. 3, in some implementations, the operations 0721, 0722, and 0723 can be implemented by the processor 40. That is, the processor 40 is further configured to determine the at least one of the texture region or the edge region according to the original depth data of the time-of-flight depth image, control the first camera 31 to obtain the phase-detection depth data of the field, and replace the original depth data of the at least one of the texture region or the edge region with the phase-detection depth data to obtain the current depth image.

Referring to FIG. 23, in some implementations, the operations 0721 and 0723 can be implemented by the processor 40. The operation 0722 can be implemented by the first camera 31. That is, the processor 40 is further configured to determine the at least one of the texture region or the edge region according to the original depth data of the time-of-flight depth image. The first camera 31 is configured to obtain the phase-detection depth data of the field. The processor 40 is further configured to replace the original depth data of the at least one of the texture region or the edge region with the phase-detection depth data, to obtain the current depth image.

In the operation 0721, only the edge region or only the texture region can be determined or both the edge region and the texture region can be determined. Correspondingly, when only the edge region is determined in the operation 0721, only original depth data of the edge region is replaced with the phase-detection depth data in the operation 0723. When only the texture region is determined in the operation 0721, only original depth data of the texture region is replaced with the phase-detection depth data in the operation 0723. When both the edge region and the texture region are determined in the operation 0721, original depth data of both the edge region and the texture region are replaced with the phase-detection depth data in the operation 0723.

The manner of determining the texture region and the edge region in the time-of-flight depth image in the operation 0721 is similar as that in the operation 051, which will not be repeated herein.

After the processor 40 determines the texture region and the edge region in the time-of-flight depth image, the processor 40 may determine an edge region and a texture region in a phase-detection depth image obtained by the phase-detection pixels of the first camera 31 based on the correspondence between the time-of-flight depth camera 20 and the first camera 31, where the phase-detection depth image carries the phase-detection depth data. The processor 40 may further replace the original depth data of the texture region and the edge region measured by the time-of-flight depth camera 20 with the phase-detection depth data of the edge region and the texture region in the phase-detection depth image, thereby obtaining the current depth image. In this way, the current depth image contains both the original depth data measured by the time-of-flight depth camera 20 and the phase-detection depth data measured by the first camera 31. The smooth region in the current depth image contains the original depth data measured by the time-of-flight depth camera 20 and the edge region and the texture region contain the phase-detection depth data measured by the first camera 31. As such, the accuracy of the depth data of the smooth region, the edge region, and the texture region can be higher.

A non-transitory computer readable storage medium is further provided. The non-transitory computer readable storage medium is configured to store a computer program. The computer program, when executed by a processor of an electronic device, causes the processor to perform the method of any of the above implementations.

The reference term "an implementation", "some implementations", "example", "specific example", or "some examples" referred to herein means that a particular feature, structure, material, or characteristic described in conjunction with the implementation or implementation may be contained in at least one implementation or implementation of this disclosure. The phrase appearing in various places in the specification does not necessarily refer to the same implementation or implementation. The particular feature, structure, material, or characteristic described may be properly combined in any one or more implementations or implementations. In addition, when the implementation or implementation is not mutually exclusive with other implementations or implementations, it is expressly and implicitly understood by those skilled in the art that an implementation described herein may be combined with other implementations or implementation manners.

The implementations of this application have been illustrated and described above. It can be understood that the implementations are exemplary and should not be construed as limiting the application. Those of ordinary skill in the art can make changes, modifications, substitutions, and variations to the implementations within the scope of this application.

What is claimed is:

1. A method for depth image acquisition, implemented in an electronic device comprising a dual camera and a time-of-flight depth camera, the method comprising:

obtaining an image of a field to determine a region of interest (ROI) in the image of the field;
obtaining a current distance to the ROI;
controlling the time-of-flight depth camera to obtain a current depth image of the field in response to the current distance being greater than a first distance; and
controlling both the dual camera and the time-of-flight depth camera to obtain the current depth image of the field in response to the current distance being not greater than the first distance;
wherein a time-of-flight depth image obtained by the time-of-flight depth camera has a first resolution and controlling the time-of-flight depth camera to obtain the current depth image of the field comprises:
up-sampling the time-of-flight depth image to obtain the current depth image, wherein the current depth image has a second resolution greater than the first resolution.

2. The method of claim 1, wherein obtaining the current distance to the ROI comprises:
controlling the time-of-flight depth camera to obtain a time-of-flight depth image of the field; and
obtaining the current distance according to the time-of-flight depth image and the ROI.

3. The method of claim 2, wherein controlling both the dual camera and the time-of-flight depth camera to obtain the current depth image of the field in response to the current distance being not greater than the first distance comprises:
determining at least one of a texture region or an edge region according to original depth data of the time-of-flight depth image;
controlling the dual camera to obtain a first image and a second image;
obtaining depth data of the at least one of the texture region or the edge region according to the time-of-flight depth image, the first image, and the second image; and
replacing original depth data of the at least one of the texture region or the edge region with the obtained depth data, to obtain the current depth image.

4. The method of claim 3, wherein obtaining the depth data of the at least one of the texture region or the edge region according to the time-of-flight depth image, the first image, and the second image comprises:
mapping the at least one of the texture region or the edge region into the first image, to obtain mapped depth data of a plurality of pixels to-be-compared in the first image;
obtaining a disparity range corresponding to each pixel to-be-compared according to each mapped depth data;
searching in a search region for a target matched pixel that matches the pixel to-be-compared, the search region being determined in the second image according to the disparity range; and
obtaining the depth data of the at least one of the texture region or the edge region according to the pixel to-be-compared and the target matched pixel.

5. The method of claim 1, wherein the dual camera comprises a first camera and a second camera, the first camera comprises an image sensor which comprises phase-detection pixels, and the method further comprises:
controlling the time-of-flight depth camera to obtain the current depth image of the field or controlling both the first camera and the time-of-flight depth camera to obtain the current depth image of the field, in response to the current distance being less than the second distance, wherein the second distance is less than the first distance.

6. The method of claim 5, wherein controlling the time-of-flight depth camera to obtain the current depth image of the field or controlling both the first camera and the time-of-flight depth camera to obtain the current depth image of the field, in response to the current distance being less than the second distance comprises:
   obtaining ambient brightness of the field;
   controlling both the first camera and the time-of-flight depth camera to obtain the current depth image of the field in response to the ambient brightness being greater than preset brightness; and
   controlling the time-of-flight depth camera to obtain the current depth image of the field in response to the ambient brightness being less than the preset brightness.

7. The method of claim 1, wherein up-sampling the time-of-flight depth image to obtain the current depth image comprises:
   performing interpolation on the time-of-flight depth image to obtain an intermediate depth image;
   processing the image of the field to obtain an edge detection image; and
   calibrating the intermediate depth image according to edge information of the edge detection image to obtain the current depth image.

8. The method of claim 1, wherein up-sampling the time-of-flight depth image to obtain the current depth image comprises:
   segmenting the time-of-flight depth image into a plurality of depth regions;
   processing the image of the field to obtain a plurality of edge detection regions;
   determining whether each of the plurality of depth regions corresponding to the plurality of edge detection regions is complete according to the plurality of edge detection regions;
   in response to any depth region being incomplete, obtaining estimated depth data of the incomplete depth region according to an edge detection region corresponding to the incomplete depth region and original depth data of the incomplete depth region; and
   obtaining the current depth image according to the original depth data and the estimated depth data.

9. The method of claim 6, wherein controlling both the first camera and the time-of-flight depth camera to obtain the current depth image of the field comprises:
   determining at least one of a texture region or an edge region according to original depth data of the time-of-flight depth image;
   controlling the first camera to obtain phase-detection depth data of the field; and
   replacing original depth data of the at least one of the texture region or the edge region with the phase-detection depth data, to obtain the current depth image.

10. An electronic device, comprising a dual camera, a time-of-flight depth camera, and a processor configured to:
   control the dual camera to obtain an image of a field to determine a region of interest (ROI) in the image of the field;
   obtain a current distance to the ROI;
   control the time-of-flight depth camera to obtain a current depth image of the field in response to the current distance being greater than a first distance; and
   control both the dual camera and the time-of-flight depth camera to obtain the current depth image of the field in response to the current distance being not greater than the first distance;
   wherein the processor configured to obtain the current distance to the ROI is configured to:
      control the time-of-flight depth camera to obtain a time-of-flight depth image of the field; and
      obtain the current distance according to the time-of-flight depth image and the ROI; and
   wherein the processor configured to control both the dual camera and the time-of-flight depth camera to obtain the current depth image of the field is configured to:
      determine at least one of a texture region or an edge region according to original depth data of the time-of-flight depth image;
      control the dual camera to obtain a first image and a second image;
      obtain depth data of the at least one of the texture region or the edge region according to the time-of-flight depth image, the first image, and the second image; and
      replace original depth data of the at least one of the texture region or the edge region with the obtained depth data, to obtain the current depth image.

11. The electronic device of claim 10, wherein the processor configured to obtain the depth data of the at least one of the texture region or the edge region according to the time-of-flight depth image, the first image, and the second image is configured to:
   map the at least one of the texture region or the edge region into the first image, to obtain mapped depth data of a plurality of pixels to-be-compared in the first image;
   obtain a disparity range corresponding to each pixel to-be-compared according to each mapped depth data;
   search in a search region for a target matched pixel that matches the pixel to-be-compared, the search region being determined in the second image according to the disparity range; and
   obtain the depth data of the at least one of the texture region or the edge region according to the pixel to-be-compared and the target matched pixel.

12. The electronic device of claim 10, wherein the dual camera comprises a first camera and a second camera, the first camera comprises an image sensor which comprises phase-detection pixels, and the processor is further configured to:
   control the time-of-flight depth camera to obtain the current depth image of the field or control both the first camera and the time-of-flight depth camera to obtain the current depth image of the field, in response to the current distance being less than the second distance, wherein the second distance is less than the first distance.

13. The electronic device of claim 12, wherein the processor configured to control the time-of-flight depth camera to obtain the current depth image of the field or control both the first camera and the time-of-flight depth camera to obtain the current depth image of the field is configured to:
   obtain ambient brightness of the field;
   control both the first camera and the time-of-flight depth camera to obtain the current depth image of the field in response to the ambient brightness being greater than preset brightness; and
   control the time-of-flight depth camera to obtain the current depth image of the field in response to the ambient brightness being less than the preset brightness.

14. The electronic device of claim 10, wherein a time-of-flight depth image obtained by the time-of-flight depth camera has a first resolution and the processor configured to control the time-of-flight depth camera to obtain the current depth image of the field is configured to:

up-sample the time-of-flight depth image to obtain the current depth image, wherein the current depth image has a second resolution greater than the first resolution.

15. The electronic device of claim 14, wherein the processor configured to up-sample the time-of-flight depth image to obtain the current depth image is configured to:

perform interpolation on the time-of-flight depth image to obtain an intermediate depth image;

process the image of the field to obtain an edge detection image; and calibrate the intermediate depth image according to edge information of the edge detection image to obtain the current depth image.

16. The electronic device of claim 14, wherein the processor configured to up-sample the time-of-flight depth image to obtain the current depth image is configured to:

segment the time-of-flight depth image into a plurality of depth regions;

process the image of the field to obtain a plurality of edge detection regions;

determine whether each of the plurality of depth regions corresponding to the plurality of edge detection regions is complete according to the plurality of edge detection regions;

in response to any depth region being incomplete, obtain estimated depth data of the incomplete depth region according to an edge detection region corresponding to the incomplete depth region and original depth data of the incomplete depth region; and obtain the current depth image according to the original depth data and the estimated depth data.

17. A non-transitory computer readable storage medium storing a computer program which, when executed by a processor of an electronic device, causes the processor to:

control a dual camera of the electronic device to obtain an image of a field to determine a region of interest (ROI) in the image of the field;

obtain a current distance to the ROI;

control a time-of-flight depth camera of the electronic device to obtain a current depth image of the field in response to the current distance being greater than a first distance; and control both the dual camera and the time-of-flight depth camera to obtain the current depth image of the field in response to the current distance being not greater than the first distance;

wherein the dual camera comprises a first camera and a second camera, the first camera comprises an image sensor which comprises phase-detection pixels, and the processor is further configured to:

control the time-of-flight depth camera to obtain the current depth image of the field or control both the first camera and the time-of-flight depth camera to obtain the current depth image of the field, in response to the current distance being less than the second distance, wherein the second distance is less than the first distance; and wherein the processor configured to control the time-of-flight depth camera to obtain the current depth image of the field or control both the first camera and the time-of-flight depth camera to obtain the current depth image of the field is configured to:

obtain ambient brightness of the field;

control both the first camera and the time-of-flight depth camera to obtain the current depth image of the field in response to the ambient brightness being greater than preset brightness; and control the time-of-flight depth camera to obtain the current depth image of the field in response to the ambient brightness being less than the preset brightness.

* * * * *